(12) United States Patent
Takatsukasa

(10) Patent No.: US 10,181,947 B2
(45) Date of Patent: Jan. 15, 2019

(54) INFORMATION PROCESSING APPARATUS, PROGRAM, AND RECORDING MEDIUM

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 164 days.

(21) Appl. No.: 15/063,719

(22) Filed: Mar. 8, 2016

(65) Prior Publication Data
US 2016/0191234 A1 Jun. 30, 2016

Related U.S. Application Data

(63) Continuation of application No. PCT/JP2015/057935, filed on Mar. 17, 2015.

(30) Foreign Application Priority Data

May 21, 2014 (JP) .................................. 2014-105641

(51) Int. Cl.
*G09C 1/00* (2006.01)
*H04L 9/06* (2006.01)

(52) U.S. Cl.
CPC .............. *H04L 9/0631* (2013.01); *G09C 1/00* (2013.01); *H04L 2209/122* (2013.01)

(58) Field of Classification Search
CPC ... G09C 1/00; H04L 9/0631; H04L 2209/122; H04L 9/0681; H04L 2209/125;
(Continued)

(56) References Cited

U.S. PATENT DOCUMENTS 8,300,805 B1* 10/2012 Langhammer ........ H04L 9/0631
380/28
8,391,475 B2* 3/2013 Gopal .................. H04L 9/0631
380/28
(Continued)

FOREIGN PATENT DOCUMENTS

CN 102025484 7/2012
JP 2003-195749 7/2003
(Continued)

OTHER PUBLICATIONS

Kaps et al. ECE-493 Final Paper Differential Power Analysis Testbed, 2011.*
(Continued)

*Primary Examiner* — Jason K Gee
*Assistant Examiner* — Shu C Gao
(74) *Attorney, Agent, or Firm* — IPUSA, PLLC

(57) ABSTRACT

An information processing apparatus is provided that performs information processing for encrypting data using AES, which includes performing a process of generating round key data on a one-byte-by-one-byte basis, performing a row shift transformation that is a process of performing row shifting for the data by use of a row shift table, performing a byte substitution transformation that is a process of performing byte substitution for the data having undergone the row shift transformation by use of a byte substitution table that is a one-dimensional array, performing a column mix transformation that is a process of performing column mixing for the data having undergone the byte substitution transformation based on equivalent expressions, performing a key add transformation that is a process of performing an exclusive-OR operation based on the round key data and the data having undergone the column mix transformation, wherein the row shift transformation, the byte substitution transformation, the column mix transfor-
(Continued)

mation, and the key add transformation are performed on a four-byte-by-four-byte basis.

8 Claims, 25 Drawing Sheets

(58) Field of Classification Search
CPC ... H04L 2209/12; H04L 9/14; H04L 2209/24; H04L 9/002; H04L 2209/16; H04L 2209/043; G06F 21/75; G06F 2221/2107; G06F 21/602; G06F 11/1076; G06F 2211/1009; G06F 2211/1057; G06F 9/3851; G06F 9/3879; G06F 9/3885; G06F 21/72; B60K 26/04; B60K 31/105; F02D 11/10; B60W 2720/106; C07C 45/41; C07C 47/06
See application file for complete search history.

(56) References Cited

U.S. PATENT DOCUMENTS

| | | | | |
|---|---|---|---|---|
| 8,417,961 | B2* | 4/2013 | Olson | H03M 13/158 |
| | | | | 712/200 |
| 8,489,897 | B2* | 7/2013 | Trichina | H04L 9/0631 |
| | | | | 713/190 |
| 8,582,757 | B2* | 11/2013 | Martinez | H04L 9/0618 |
| | | | | 380/28 |
| 9,191,197 | B2* | 11/2015 | Hotta | G09C 1/00 |
| 9,843,441 | B2* | 12/2017 | Mathew | H04L 9/0631 |
| 2011/0246787 | A1* | 10/2011 | Farrugia | G06F 21/60 |
| | | | | 713/189 |
| 2013/0016825 | A1* | 1/2013 | Efrat | H04L 9/0631 |
| | | | | 380/28 |
| 2013/0016836 | A1* | 1/2013 | Farrugia | H04L 9/0631 |
| | | | | 380/255 |
| 2013/0202105 | A1 | 8/2013 | Shimizu | |
| 2014/0301549 | A1* | 10/2014 | Guleria | G09C 1/00 |
| | | | | 380/44 |
| 2014/0369499 | A1* | 12/2014 | Kawabata | H04L 9/0631 |
| | | | | 380/47 |
| 2015/0222423 | A1* | 8/2015 | Pepin | G06F 7/00 |
| | | | | 713/189 |

FOREIGN PATENT DOCUMENTS

| | | |
|---|---|---|
| JP | 2013-045072 | 3/2013 |
| JP | 2014-089271 | 5/2014 |

OTHER PUBLICATIONS

Mohammad et al., A Novel S-box of AES Algorithm Using Variable Mapping Technique, 13th International Conference on Aerospace Sciences & Aviation Technology, ASAT-13, May 26-28, 2009 (Year: 2009).*

Chodowiec, P. et al., Very Compact FPGA Implementation of the AES Algorithm, Lecture Notes in Computer Science, vol. 2779, 2003, pp. 319-333, especially Abstract, 3 Architecture of the Compact Implementation.

Chang, C.-J. et al., 8-bit AES FPGA Implementation using Block RAM, Proc. of the 33rd Annual Conference of the IEEE Industrial Electronics Society, 2007, pp. 2654-2659 especially III. Hardware Implementation of AES.

Poettering, B., RijndaelFurious, AVRAES: The AES block cipher on AVR controllers [online], 2006, [retrieved on Jun. 10, 2015]. Retrieved from the Internet: <URL: http://point-at-infinity.org/avraes/rijndaelfurious.asm.html, http://point-at-infinity.org/avraes/>.

Joppe, W. B. et al., Fast Implementations of AES on Various Platforms, Cryptology ePrint Archive [online], Nov. 6, 2009, [retrieved on Jun. 10, 2015] Retrieved from the Internet: <URL: http://eprint.iacr.org/2009/501>.

Specification for the Advanced Encryption Standard (AES), Federal Information Processing Standards Publication 197, National Institute of Standards and Technology, Nov. 26, 2001, [retrieved on Jun. 10, 2015]. Retrieved from the Internet: <URL: http://csrc.nist.gov/publications/PubsFIPS.html>.

Office Action dated Jun. 2, 2017 issued with respect to the corresponding Chinese Patent Application No. 201580001780.4.

Intel AES New Instructions (Intel AES-NI), Jan. 22, 2014, Retrieved from the Internet: <URL: http://www.isus.jp/hpc/intel-advanced-encryption-standard-instructions-aes-ni/>, with full translation.

Office Action dated Apr. 24, 2018 issued with respect to the corresponding Japanese Patent Application No. 2016-520973 with partial translation.

* cited by examiner

FIG.2A

```
KeyExpansion(byte key[4*Nk], word w[Nb*(Nr+1)], Nk)
begin
    word temp                                              ~21 i = 0
    while (i < Nk)                                         ~22
        w[i] = word(key[4*i], key[4*i+1], key[4*i+2], key[4*i+3])
        i = i+1
    end while i = Nk
    while (i < Nb * (Nr+1))                                ~23
        temp = w[i-1]
        if (i mod Nk = 0)
            temp = SubWord(RotWord(temp)) xor Rcon[i/Nk]
        else if (Nk > 6 and i mod Nk = 4)
            temp = SubWord(temp)
        end if
        w[i] = w[i-Nk] xor temp
        i = i + 1
    end while
end
```

FIG.3A

```
/* KEY LENGTH (Nk) AND ROUND NUMBER (R)
128-bit: Nk=4,R=10
192-bit: Nk=6,R=12
256-bit: Nk=8,R=14 */

Rcon = 0x01;
Nk4 = Nk * 4;
i_max = Nb * 4 * (R + 1);                    /31
for( i=Nk4; i<i_max; i++ )
{
        m = i % Nk4;
        if( (Nk4 == (8*4)) && ((m & 28) == 16) )
        {       /* CONDITION (1) */
                m = SubByte[ r[i-4] ];
        }
        else if( m >= 4 )
        {       /* CONDITION (2) */
                m = r[i-4];
        }
        else if( m == 0 )
        {       /* CONDITION (3) */
                m = SubByte[ r[i-3] ] ^ Rcon;
                Rcon = IRPLY(Rcon);
        }
        else if( m == 3 )
        {       /* CONDITION (4) */
                m = SubByte[ r[i-7] ];
        }
        else
        {       /* CONDITION (5) */
                m = SubByte[ r[i-3] ];
        }
        r[i] = r[i- Nk4] ^ m;
}
```

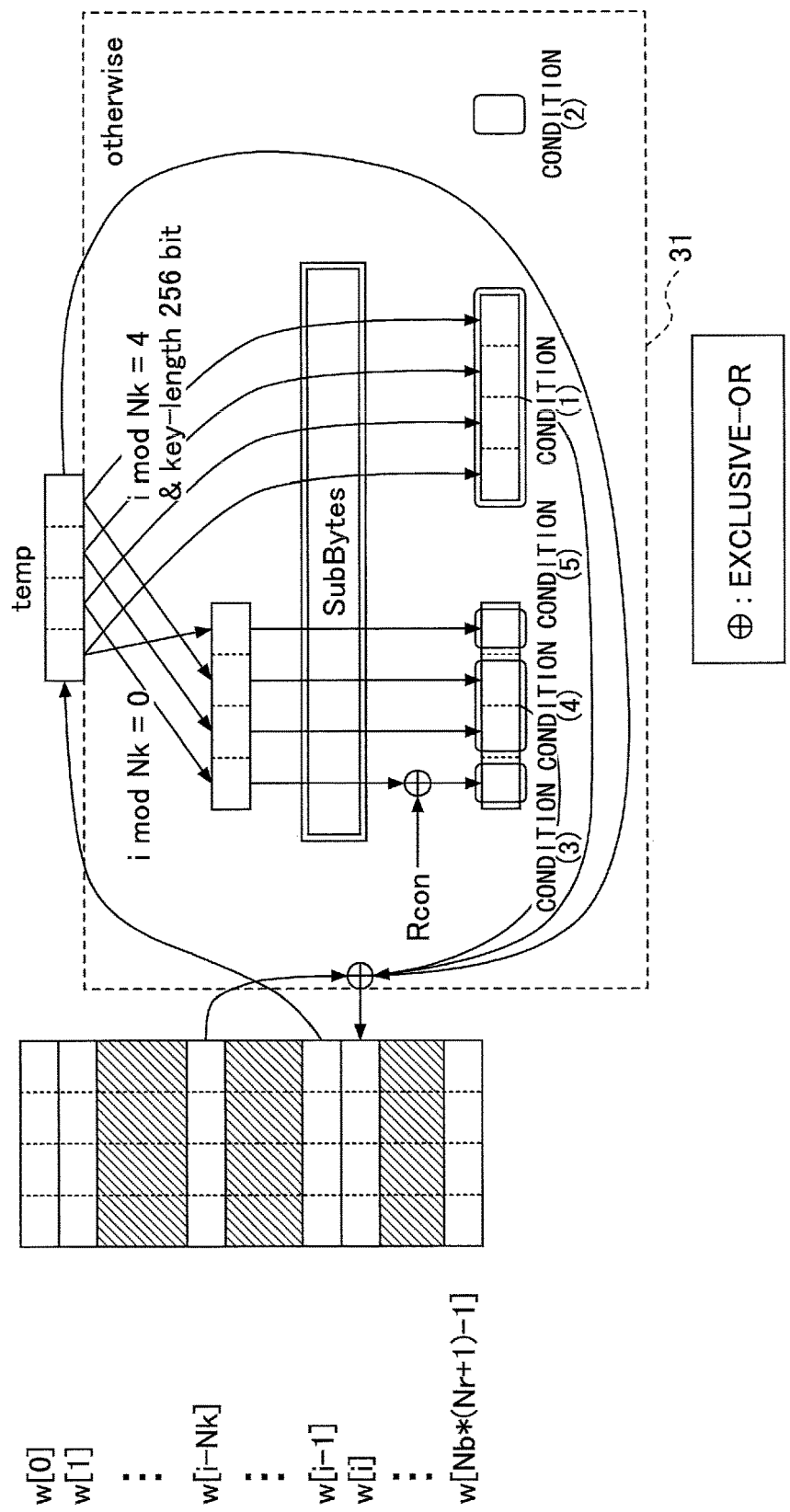

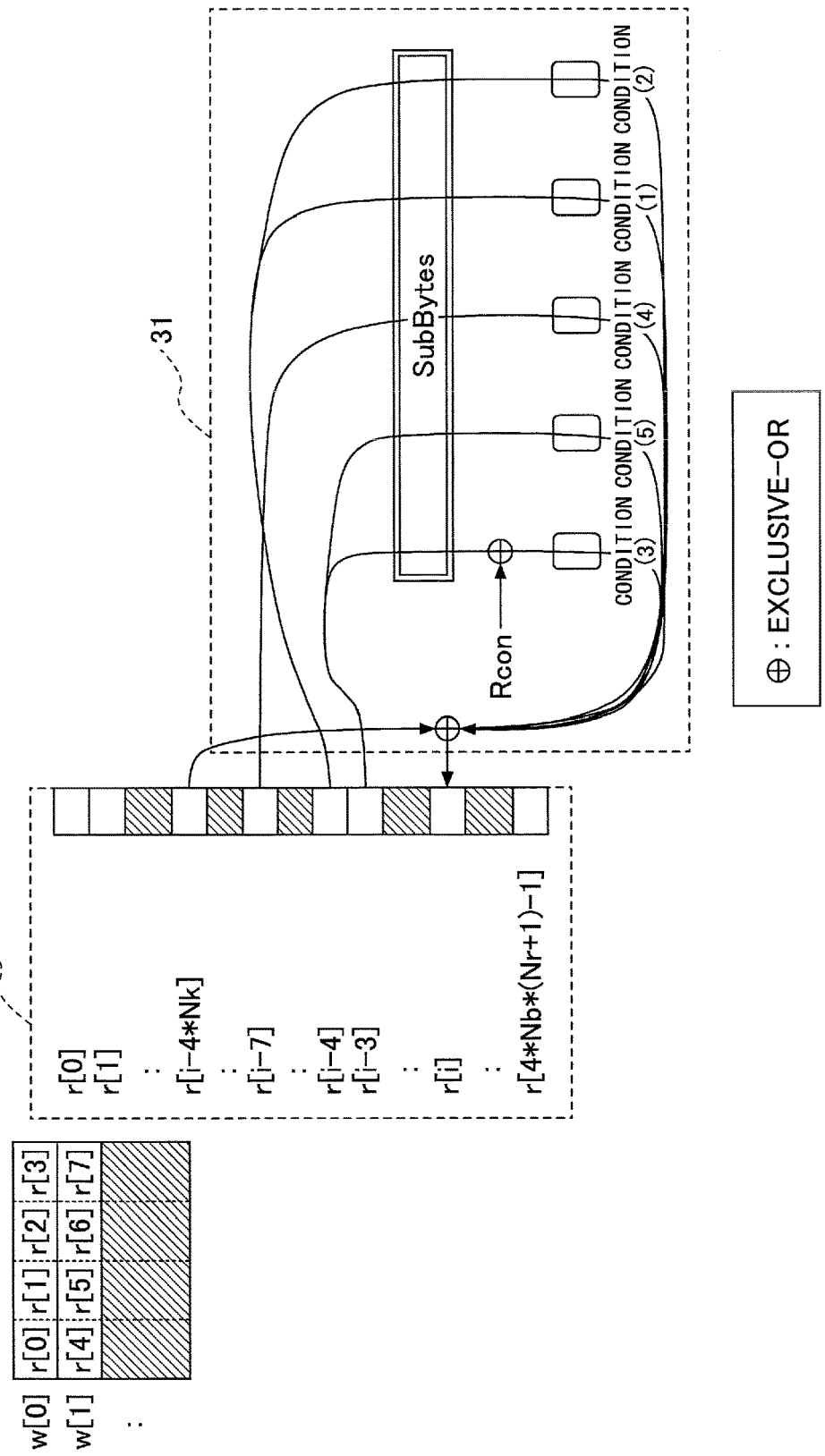

FIG.4A

```
Cipher(byte in[4*Nb], byte out[4*Nb], word w[Nb*(Nr+1)])
begin
  4A1   byte state[4,Nb]                    4A2
                             41
        state = in AddRoundKey(state, w[0, Nb-1])

for round = 1 step 1 to Nr-1
                SubBytes(state)
                ShiftRows(state)
                MixColumns(state)
                AddRoundKey(state, w[round*Nb, (round+1)*Nb-1])
        end for                                              42

SubBytes(state)
        ShiftRows(state)
        AddRoundKey(state, w[Nr*Nb, (Nr+1)*Nb-1])

out = state
end
```

```
InvCipher(byte in[4*Nb], byte out[4*Nb], word w[Nb*(Nr+1)])
begin
   4B1   byte state[4,Nb]                4B2
                              41
        state = in AddRoundKey(state, w[Nr*Nb, (Nr+1)*Nb-1])

for round = Nr-1 step -1 downto 1
             InvShiftRows(state)
             InvSubBytes(state)
             AddRoundKey(state, w[round*Nb, (round+1)*Nb-1])
             InvMixColumns(state)
        end for                                         43

InvShiftRows(state)
        InvSubBytes(state)
        AddRoundKey(state, w[0, Nb-1])

out = state
end
```

| S00 | S01 | S02 | S03 | S04 | S05 | S06 | S07 | S08 | S09 | S10 | S11 | S12 | S13 | S14 | S15 |
|---|---|---|---|---|---|---|---|---|---|---|---|---|---|---|---|

```
         10Fun2        10IN      10Fun1            10C1 in1_0 = InvSubBytes[ in [ InvShiftRows[0] ] ]^ r[0+(16*round) ];
in1_1 = InvSubBytes[ in [ InvShiftRows[1] ] ]^ r[1+(16*round) ];
in1_2 = InvSubBytes[ in [ InvShiftRows[2] ] ]^ r[2+(16*round) ];
in1_3 = InvSubBytes[ in [ InvShiftRows[3] ] ]^ r[3+(16*round) ];

in1_01 = in1_0 ^ in1_1;
in1_23 = in1_2 ^ in1_3;

in2_01 = IRPLY(in1_01);
in2_12 = IRPLY(in1_1 ^ in1_2);
in2_23 = IRPLY(in1_23);
in2_30 = IRPLY(in1_3 ^ in1_0);

in4_02 = IRPLY(in2_01 ^ in2_12);
in4_13 = IRPLY(in2_12 ^ in2_23);

in9_0123 = IRPLY(in4_02 ^ in4_13) ^ in1_01 ^ in1_23;

out[0] = in9_0123 ^ in4_02 ^ in2_01 ^ in1_0;
out[1] = in9_0123 ^ in4_13 ^ in2_12 ^ in1_1;
out[2] = in9_0123 ^ in4_02 ^ in2_23 ^ in1_2;
out[3] = in9_0123 ^ in4_13 ^ in2_30 ^ in1_3;
                                                        10C2
                                                          10
```

FIG.8

```
ADKout[cnt] = ADKin[cnt] ^ KD[cnt+(16*ROU)];
     |           |        |         |
     64          61       63        62
```

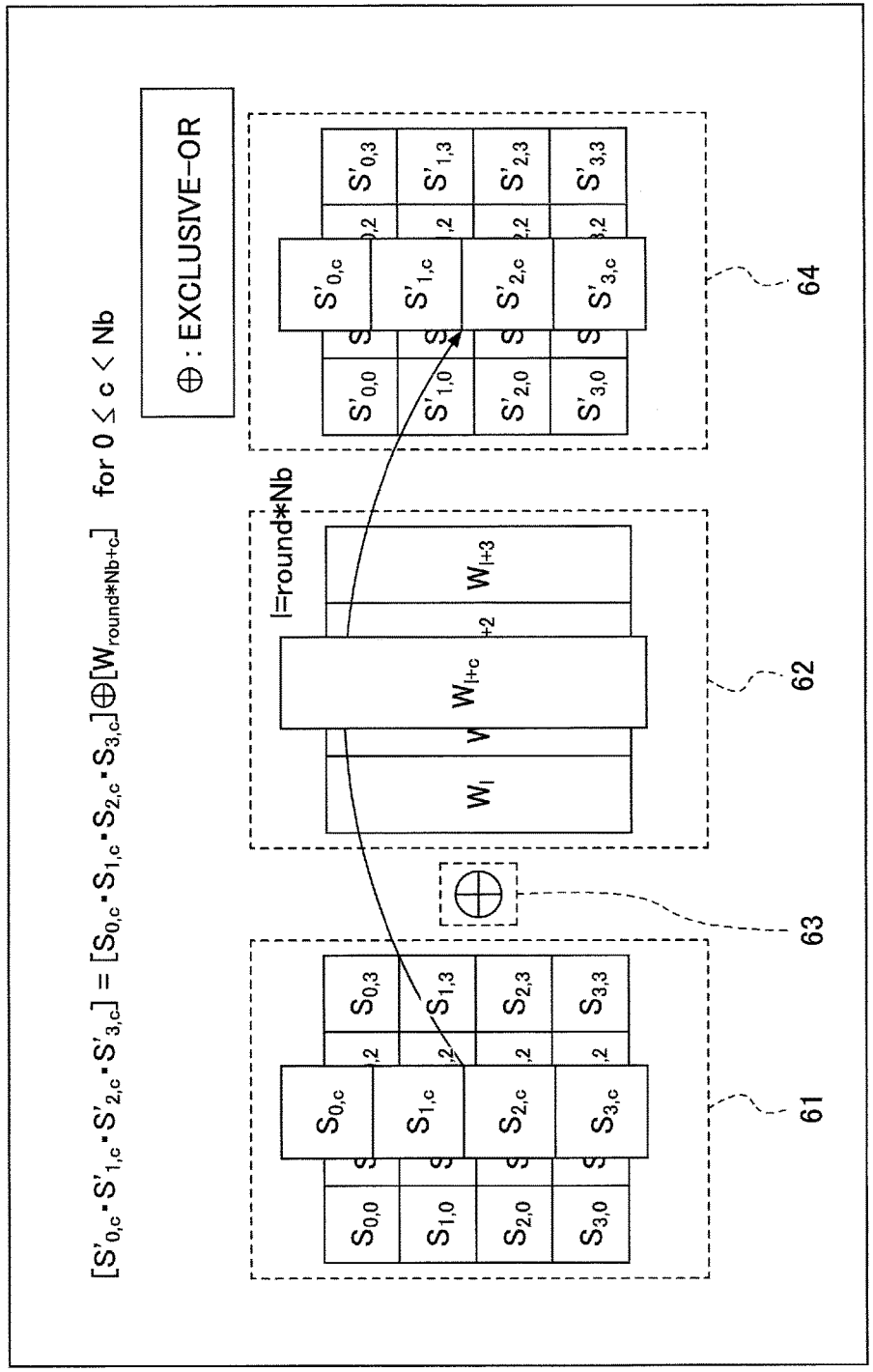

FIG.12A

```
static const uint8_t InvSubBytes[256] = {
0x52,0x09,0x6a,0xd5,0x30,0x36,0xa5,0x38,0xbf,0x40,0xa3,0x9e,0x81,0xf3,0xd7,0xfb,
0x7c,0xe3,0x39,0x82,0x9b,0x2f,0xff,0x87,0x34,0x8e,0x43,0x44,0xc4,0xde,0xe9,0xcb,
0x54,0x7b,0x94,0x32,0xa6,0xc2,0x23,0x3d,0xee,0x4c,0x95,0x0b,0x42,0xfa,0xc3,0x4e,
0x08,0x2e,0xa1,0x66,0x28,0xd9,0x24,0xb2,0x76,0x5b,0xa2,0x49,0x6d,0x8b,0xd1,0x25,
0x72,0xf8,0xf6,0x64,0x86,0x68,0x98,0x16,0xd4,0xa4,0x5c,0xcc,0x5d,0x65,0xb6,0x92,
0x6c,0x70,0x48,0x50,0xfd,0xed,0xb9,0xda,0x5e,0x15,0x46,0x57,0xa7,0x8d,0x9d,0x84,
0x90,0xd8,0xab,0x00,0x8c,0xbc,0xd3,0x0a,0xf7,0xe4,0x58,0x05,0xb8,0xb3,0x45,0x06,
0xd0,0x2c,0x1e,0x8f,0xca,0x3f,0x0f,0x02,0xc1,0xaf,0xbd,0x03,0x01,0x13,0x8a,0x6b,
0x3a,0x91,0x11,0x41,0x4f,0x67,0xdc,0xea,0x97,0xf2,0xcf,0xce,0xf0,0xb4,0xe6,0x73,
0x96,0xac,0x74,0x22,0xe7,0xad,0x35,0x85,0xe2,0xf9,0x37,0xe8,0x1c,0x75,0xdf,0x6e,
0x47,0xf1,0x1a,0x71,0x1d,0x29,0xc5,0x89,0x6f,0xb7,0x62,0x0e,0xaa,0x18,0xbe,0x1b,
0xfc,0x56,0x3e,0x4b,0xc6,0xd2,0x79,0x20,0x9a,0xdb,0xc0,0xfe,0x78,0xcd,0x5a,0xf4,
0x1f,0xdd,0xa8,0x33,0x88,0x07,0xc7,0x31,0xb1,0x12,0x10,0x59,0x27,0x80,0xec,0x5f,
0x60,0x51,0x7f,0xa9,0x19,0xb5,0x4a,0x0d,0x2d,0xe5,0x7a,0x9f,0x93,0xc9,0x9c,0xef,
0xa0,0xe0,0x3b,0x4d,0xae,0x2a,0xf5,0xb0,0xc8,0xeb,0xbb,0x3c,0x83,0x53,0x99,0x61,
0x17,0x2b,0x04,0x7e,0xba,0x77,0xd6,0x26,0xe1,0x69,0x14,0x63,0x55,0x21,0x0c,0x7d
};
```

9

|   |   | y |   |   |   |   |   |   |   |   |   |   |   |   |   |   |
|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| x | 0 | 52 | 09 | 6a | d5 | 30 | 36 | a5 | 38 | bf | 40 | a3 | 9e | 81 | f3 | d7 | fb |
|   | 1 | 7c | e3 | 39 | 82 | 9b | 2f | ff | 87 | 34 | 8e | 43 | 44 | c4 | de | e9 | cb |
|   | 2 | 54 | 7b | 94 | 32 | a6 | c2 | 23 | 3d | ee | 4c | 95 | 0b | 42 | fa | c3 | 4e |
|   | 3 | 08 | 2e | a1 | 66 | 28 | d9 | 24 | b2 | 76 | 5b | a2 | 49 | 6d | 8b | d1 | 25 |
|   | 4 | 72 | f8 | f6 | 64 | 86 | 68 | 98 | 16 | d4 | a4 | 5c | cc | 5d | 65 | b6 | 92 |
|   | 5 | 6c | 70 | 48 | 50 | fd | ed | b9 | da | 5e | 15 | 46 | 57 | a7 | 8d | 9d | 84 |
|   | 6 | 90 | d8 | ab | 00 | 8c | bc | d3 | 0a | f7 | e4 | 58 | 05 | b8 | b3 | 45 | 06 |
|   | 7 | d0 | 2c | 1e | 8f | ca | 3f | 0f | 02 | c1 | af | bd | 03 | 01 | 13 | 8a | 6b |
|   | 8 | 3a | 91 | 11 | 41 | 4f | 67 | dc | ea | 97 | f2 | cf | ce | f0 | b4 | e6 | 73 |
|   | 9 | 96 | ac | 74 | 22 | e7 | ad | 35 | 85 | e2 | f9 | 37 | e8 | 1c | 75 | df | 6e |
|   | a | 47 | f1 | 1a | 71 | 1d | 29 | c5 | 89 | 6f | b7 | 62 | 0e | aa | 18 | be | 1b |
|   | b | fc | 56 | 3e | 4b | c6 | d2 | 79 | 20 | 9a | db | c0 | fe | 78 | cd | 5a | f4 |
|   | c | 1f | dd | a8 | 33 | 88 | 07 | c7 | 31 | b1 | 12 | 10 | 59 | 27 | 80 | ec | 5f |
|   | d | 60 | 51 | 7f | a9 | 19 | b5 | 4a | 0d | 2d | e5 | 7a | 9f | 93 | c9 | 9c | ef |
|   | e | a0 | e0 | 3b | 4d | ae | 2a | f5 | b0 | c8 | eb | bb | 3c | 83 | 53 | 99 | 61 |
|   | f | 17 | 2b | 04 | 7e | ba | 77 | d6 | 26 | e1 | 69 | 14 | 63 | 55 | 21 | 0c | 7d |

in2_01 = IRPLY(in1_01);
in2_12 = IRPLY(in[1] ^ in[2]);
in2_23 = IRPLY(in1_23);
in2_30 = IRPLY(in[3] ^ in[0]);

in4_02 = IRPLY(in2_01 ^ in2_12);
in4_13 = IRPLY(in2_12 ^ in2_23);

in9_0123 = IRPLY(in4_02 ^ in4_13) ^ in1_01 ^ in1_23;

out[0] = in9_0123 ^ in4_02 ^ in2_01 ^ in[0];
out[1] = in9_0123 ^ in4_13 ^ in2_12 ^ in[1];
out[2] = in9_0123 ^ in4_02 ^ in2_23 ^ in[2];
out[3] = in9_0123 ^ in4_13 ^ in2_30 ^ in[3];
```
~12

```
static const uint8_t Irply[2] = { 0x00, 0x1b };
#define IRPLY(x) (((x)<<1) ^ Irply[(x)>>7])
```
~13

FIG.15A $$\begin{bmatrix} S'_{0,c} \\ S'_{1,c} \\ S'_{2,c} \\ S'_{3,c} \end{bmatrix} = \begin{bmatrix} 0e & 0b & 0d & 09 \\ 09 & 0e & 0b & 0d \\ 0d & 09 & 0e & 0b \\ 0b & 0d & 09 & 0e \end{bmatrix} \begin{bmatrix} S_{0,c} \\ S_{1,c} \\ S_{2,c} \\ S_{3,c} \end{bmatrix} \quad \boxed{\oplus : \text{EXCLUSIVE-OR}}$$

for $0 \leq c < Nb$ $S'_{0,c} = (\{0e\} \cdot S_{0,c}) \oplus (\{0b\} \cdot S_{1,c}) \oplus (\{0d\} \cdot S_{2,c}) \oplus (\{09\} \cdot S_{3,c})$ $S'_{1,c} = (\{09\} \cdot S_{0,c}) \oplus (\{0e\} \cdot S_{1,c}) \oplus (\{0b\} \cdot S_{2,c}) \oplus (\{0d\} \cdot S_{3,c})$ $S'_{2,c} = (\{0d\} \cdot S_{0,c}) \oplus (\{09\} \cdot S_{1,c}) \oplus (\{0e\} \cdot S_{2,c}) \oplus (\{0b\} \cdot S_{3,c})$ $S'_{3,c} = (\{0b\} \cdot S_{0,c}) \oplus (\{0d\} \cdot S_{1,c}) \oplus (\{09\} \cdot S_{2,c}) \oplus (\{0e\} \cdot S_{3,c})$

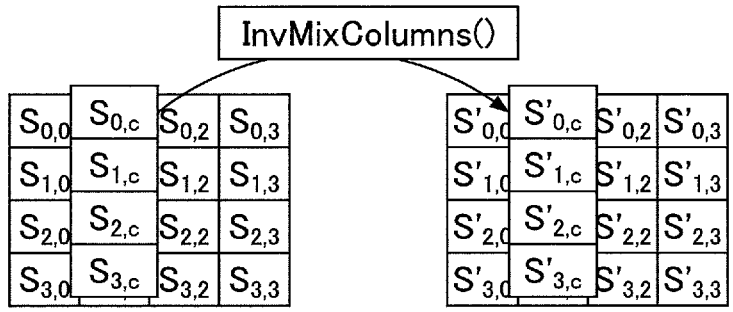

FIG.15B

```
out[0] = (0e·in[0]) ^ (0b·in[1]) ^ (0d·in[2]) ^ (09·in[3]);
out[1] = (09·in[0]) ^ (0e·in[1]) ^ (0b·in[2]) ^ (0d·in[3]);
out[2] = (0d·in[0]) ^ (09·in[1]) ^ (0e·in[2]) ^ (0b·in[3]);
out[3] = (0b·in[0]) ^ (0d·in[1]) ^ (09·in[2]) ^ (0e·in[3]);
```

FIG.15C

```
01·x = x;
02·x = IRPLY(x);
03·x = (02·x) ^ x;
04·x = IRPLY(02·x);
05·x = (04·x) ^ x;
06·x = (04·x) ^ (02·x);
07·x = (04·x) ^ (02·x) ^ x;
08·x = IRPLY(04·x);
09·x = (08·x) ^ x;
0a·x = (08·x) ^ (02·x);
0b·x = (08·x) ^ (02·x) ^ x;
0c·x = (08·x) ^ (04·x);
0d·x = (08·x) ^ (04·x) ^ x;
0e·x = (08·x) ^ (04·x) ^ (02·x);
0f·x = (08·x) ^ (04·x) ^ (02·x) ^ x;
```

FIG.15D

```
0e·in[x] = IRPLY(IRPLY(IRPLY(in[x]))) ^ IRPLY(IRPLY(in[x])) ^ IRPLY(in[x]);
0b·in[x] = IRPLY(IRPLY(IRPLY(in[x]))) ^ IRPLY(in[x]) ^ in[x];
0d·in[x] = IRPLY(IRPLY(IRPLY(in[x]))) ^ IRPLY(IRPLY(in[x])) ^ in[x];
09·in[x] = IRPLY(IRPLY(IRPLY(in[x]))) ^ in[x];
```

FIG.15E

```
out[0] = IRPLY(IRPLY(IRPLY(in[0]))) ^ IRPLY(IRPLY(in[0])) ^ IRPLY(in[0])
       ^ IRPLY(IRPLY(IRPLY(in[1]))) ^ IRPLY(in[1]) ^ in[1]
       ^ IRPLY(IRPLY(IRPLY(in[2]))) ^ IRPLY(IRPLY(in[2])) ^ in[2]
       ^ IRPLY(IRPLY(IRPLY(in[3]))) ^ in[3];
       = IRPLY(IRPLY(IRPLY(in[0]^in[1]^in[2]^in[3])))
       ^ IRPLY(IRPLY(in[0]^in[2]))
       ^ IRPLY(in[0]^in[1])
       ^ in[1]^in[2]^in[3];
out[1] = IRPLY(IRPLY(IRPLY(in[1]))) ^ IRPLY(IRPLY(in[1])) ^ IRPLY(in[1])
       ^ IRPLY(IRPLY(IRPLY(in[2]))) ^ IRPLY(in[2]) ^ in[2]
       ^ IRPLY(IRPLY(IRPLY(in[3]))) ^ IRPLY(IRPLY(in[3])) ^ in[3]
       ^ IRPLY(IRPLY(IRPLY(in[0]))) ^ in[0];
       = IRPLY(IRPLY(IRPLY(in[1]^in[2]^in[3]^in[0])))
       ^ IRPLY(IRPLY(in[1]^in[3]))
       ^ IRPLY(in[1]^in[2])
       ^ in[2]^in[3]^in[0];
out[2] = IRPLY(IRPLY(IRPLY(in[2]))) ^ IRPLY(IRPLY(in[2])) ^ IRPLY(in[2])
       ^ IRPLY(IRPLY(IRPLY(in[3]))) ^ IRPLY(in[3]) ^ in[3]
       ^ IRPLY(IRPLY(IRPLY(in[0]))) ^ IRPLY(IRPLY(in[0])) ^ in[0]
       ^ IRPLY(IRPLY(IRPLY(in[1]))) ^ in[1];
       = IRPLY(IRPLY(IRPLY(in[2]^in[3]^in[0]^in[1])))
       ^ IRPLY(IRPLY(in[2]^in[0]))
       ^ IRPLY(in[2]^in[3])
       ^ in[3]^in[0]^in[1];
out[3] = IRPLY(IRPLY(IRPLY(in[3]))) ^ IRPLY(IRPLY(in[3])) ^ IRPLY(in[3])
       ^ IRPLY(IRPLY(IRPLY(in[0]))) ^ IRPLY(in[0]) ^ in[0]
       ^ IRPLY(IRPLY(IRPLY(in[1]))) ^ IRPLY(IRPLY(in[1])) ^ in[1]
       ^ IRPLY(IRPLY(IRPLY(in[2]))) ^ in[2];
       = IRPLY(IRPLY(IRPLY(in[3]^in[0]^in[1]^in[2])))
       ^ IRPLY(IRPLY(in[3]^in[1]))
       ^ IRPLY(in[3]^in[0])
       ^ in[0]^in[1]^in[2];
```

FIG.16

```
static const uint8_t Irply[256] = {
0x00,0x02,0x04,0x06,0x08,0x0a,0x0c,0x0e,0x10,0x12,0x14,0x16,0x18,0x1a,0x1c,0x1e,
0x20,0x22,0x24,0x26,0x28,0x2a,0x2c,0x2e,0x30,0x32,0x34,0x36,0x38,0x3a,0x3c,0x3e,
0x40,0x42,0x44,0x46,0x48,0x4a,0x4c,0x4e,0x50,0x52,0x54,0x56,0x58,0x5a,0x5c,0x5e,
0x60,0x62,0x64,0x66,0x68,0x6a,0x6c,0x6e,0x70,0x72,0x74,0x76,0x78,0x7a,0x7c,0x7e,
0x80,0x82,0x84,0x86,0x88,0x8a,0x8c,0x8e,0x90,0x92,0x94,0x96,0x98,0x9a,0x9c,0x9e,
0xa0,0xa2,0xa4,0xa6,0xa8,0xaa,0xac,0xae,0xb0,0xb2,0xb4,0xb6,0xb8,0xba,0xbc,0xbe,
0xc0,0xc2,0xc4,0xc6,0xc8,0xca,0xcc,0xce,0xd0,0xd2,0xd4,0xd6,0xd8,0xda,0xdc,0xde,
0xe0,0xe2,0xe4,0xe6,0xe8,0xea,0xec,0xee,0xf0,0xf2,0xf4,0xf6,0xf8,0xfa,0xfc,0xfe,
0x1b,0x19,0x1f,0x1d,0x13,0x11,0x17,0x15,0x0b,0x09,0x0f,0x0d,0x03,0x01,0x07,0x05,
0x3b,0x39,0x3f,0x3d,0x33,0x31,0x37,0x35,0x2b,0x29,0x2f,0x2d,0x23,0x21,0x27,0x25,
0x5b,0x59,0x5f,0x5d,0x53,0x51,0x57,0x55,0x4b,0x49,0x4f,0x4d,0x43,0x41,0x47,0x45,
0x7b,0x79,0x7f,0x7d,0x73,0x71,0x77,0x75,0x6b,0x69,0x6f,0x6d,0x63,0x61,0x67,0x65,
0x9b,0x99,0x9f,0x9d,0x93,0x91,0x97,0x95,0x8b,0x89,0x8f,0x8d,0x83,0x81,0x87,0x85,
0xbb,0xb9,0xbf,0xbd,0xb3,0xb1,0xb7,0xb5,0xab,0xa9,0xaf,0xad,0xa3,0xa1,0xa7,0xa5,
0xdb,0xd9,0xdf,0xdd,0xd3,0xd1,0xd7,0xd5,0xcb,0xc9,0xcf,0xcd,0xc3,0xc1,0xc7,0xc5,
0xfb,0xf9,0xff,0xfd,0xf3,0xf1,0xf7,0xf5,0xeb,0xe9,0xef,0xed,0xe3,0xe1,0xe7,0xe5
};
#define IRPLY(x) Irply[x]
```

INFORMATION PROCESSING APPARATUS, PROGRAM, AND RECORDING MEDIUM

CROSS-REFERENCE TO RELATED APPLICATIONS

The present application is based on Japanese priority application No. 2014-105641 filed on May 21, 2014, with the Japanese Patent Office, the entire contents of which are hereby incorporated by reference. The present application is a continuation application of International Application PCT/JP2015/057935 filed on Mar. 17, 2015 and designated the U.S., the entire contents of which are incorporated herein by reference.

BACKGROUND OF THE INVENTION

1. Field of the Invention

The present invention generally relates to an information processing apparatus, a program, and a recording medium.

2. Description of the Related Art

Conventionally, data encryption methods known in the art include AES (Advanced Encryption Standard) defined by FIPS (Federal Information Processing Standard) 197.

In the case of encrypting or decrypting data by use of AES, parameters used in transformations are set such that parameters used in encryption are different from parameters used in decryption. Such an arrangement is known to reduce data storage volume (see Patent Document 1, for example).

The conventional arrangement, however, is associated with the risk of the program having a large data size due to a large amount of source code descriptions.

One aspect of the present invention is aimed at reducing the program data size by use of a one-dimensional array.

RELATED-ART DOCUMENTS

Patent Document

Patent Document 1: Japanese Patent Application Publication No. 2003-195749

SUMMARY OF THE INVENTION

According to an embodiment, an information processing apparatus for encrypting data using AES is characterized by including performing a process of generating round key data on a one-byte-by-one-byte basis, performing a row shift transformation that is a process of performing row shifting for data by use of a row shift table, performing a byte substitution transformation that is a process of performing byte substitution for the data having undergone the row shift transformation by use of a byte substitution table that is a one-dimensional array, performing a column mix transformation that is a process of performing column mixing for the data having undergone the byte substitution transformation based on equivalent expressions, performing a key add transformation that is a process of performing an exclusive-OR operation based on the round key data and the data having undergone the column mix transformation, wherein the row shift transformation, the byte substitution transformation, the column mix transformation, and the key add transformation are performed on a four-byte-by-four-byte basis.

The reduction of program data size is enabled.

BRIEF DESCRIPTION OF THE DRAWINGS

FIG. 2A is a drawing (1) illustrating an example of the process of generating round key data of a comparative example;

FIG. 3A is a drawing (1) illustrating an example of the process of generating round key data according to an embodiment of the present invention;

FIG. 3B is a drawing (2) illustrating an example of the process of generating round key data according to an embodiment of the present invention;

FIG. 3C is a drawing (3) illustrating an example of the process of generating round key data according to an embodiment of the present invention;

FIG. 4A is a drawing (1) illustrating an example of the process for encryption and decryption of the comparative example;

FIG. 4B is a drawing (2) illustrating an example of the process for encryption and decryption of the comparative example;

FIG. 5 is a drawing illustrating an example of a one-dimensional array of input data according to the embodiment of the present invention;

FIG. 7B is a source code illustrating an example of a four-byte process in one round of decryption according to the embodiment of the present invention;

FIG. 8 is a source code illustrating an example of the key add transformation for encryption or decryption according to the embodiment of the present invention;

FIG. 9 is a drawing illustrating an example of the result of performing the key add transformation for encryption or decryption according to the embodiment of the present invention;

FIG. 12A is a source code (1) illustrating an example of the byte substitution transformation for decryption according to the embodiment of the present invention;

FIG. 14 is a source code illustrating an example of the column mix transformation for decryption according to the embodiment of the present invention;

FIG. 15A is a drawing (1) illustrating an example of the result of performing the column mix transformation for decryption according to the embodiment of the present invention;

FIG. 15B is a drawing (2) illustrating an example of the result of performing the column mix transformation for decryption according to the embodiment of the present invention;

FIG. 15C is a drawing (3) illustrating an example of the result of performing the column mix transformation for decryption according to the embodiment of the present invention;

FIG. 15D is a drawing (4) illustrating an example of the result of performing the column mix transformation for decryption according to the embodiment of the present invention;

FIG. 15E is a drawing (5) illustrating an example of the result of performing the column mix transformation for decryption according to the embodiment of the present invention;

FIG. 16 is a drawing illustrating an example in which the column mix transformation for decryption according to the embodiment of the present invention is implemented by use of a column mix table.

DESCRIPTION OF THE PREFERRED EMBODIMENTS

In the following, a description will be given of embodiments of the present invention.

An information processing apparatus may be an embedded system 1. In the following, a description will be given by using the embedded system 1 as an example. The embedded system 1 may be embedded in industrial equipment or home electric appliances to provide specific functions, for example. The information processing apparatus may be a PC (personal computer) or the like.

<Example of Hardware Configuration of Embedded System>

Figure 1:
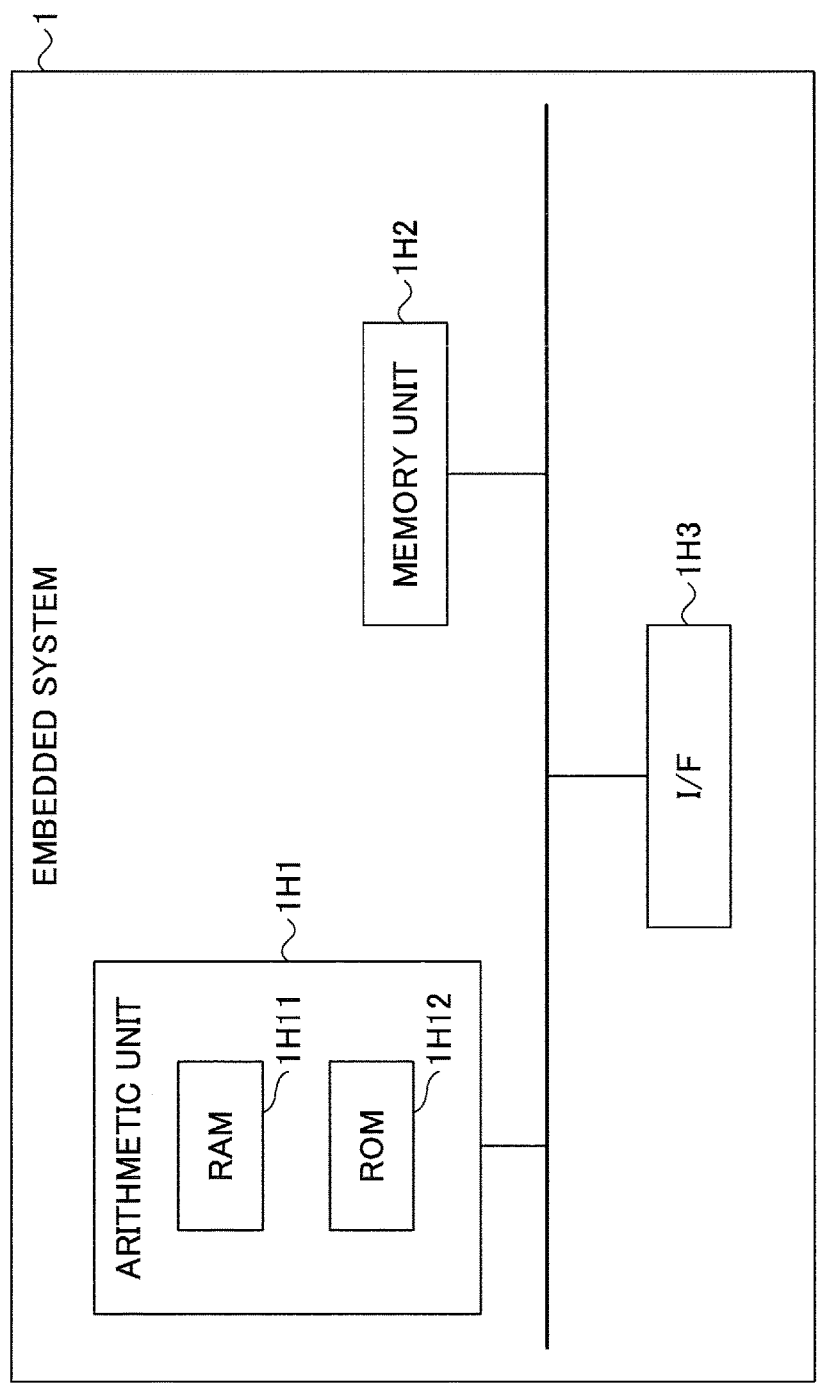
FIG. 1 is a block diagram illustrating an example of the hardware configuration of an embedded system according to an embodiment of the present invention.

FIG. 1 is a block diagram illustrating an example of the hardware configuration of an embedded system according to an embodiment of the present invention.

The embedded system 1 includes an arithmetic unit 1H1, a memory unit 1H2, and an I/F (interface) 1H3.

The arithmetic unit 1H1 may be a CPU (central processing unit) or an MPU (micro-processing unit). The arithmetic unit 1H1 serves to perform arithmetic operations relating to various processes performed by the embedded system 1, and also serves as a control unit for controlling the devices constituting the embedded system 1. The arithmetic unit 1H1 further includes embedded memory areas such as a RAM (random access memory) 1H11 and ROM (read-only memory) 1H12.

The RAM 1H11 serves as a memory unit to which programs or data or the like are loaded when the arithmetic unit 1H1 performs arithmetic and control operations.

The ROM 1H12 serves as a memory unit which stores programs or data or the like that are used when the arithmetic unit 1H1 performs arithmetic and control operations.

The memory unit 1H2 is generally referred to as a memory. The memory unit 1H2 is a storage device to which programs or data or the like are loaded when the embedded system 1 performs various processes under the control of the arithmetic unit 1H1.

The I/F 1H3 is an interface for inputting and outputting data or the like into and from the embedded system 1. The I/F 1H3 is implemented by use of a connector, a cable, a driver, and the like.

The hardware configuration is not limited to the configuration illustrated in FIG. 1. For example, the embedded system 1 may not have the memory unit 1H2.

<Comparative Example of Generation of Round Key Data>

Figure 2B:
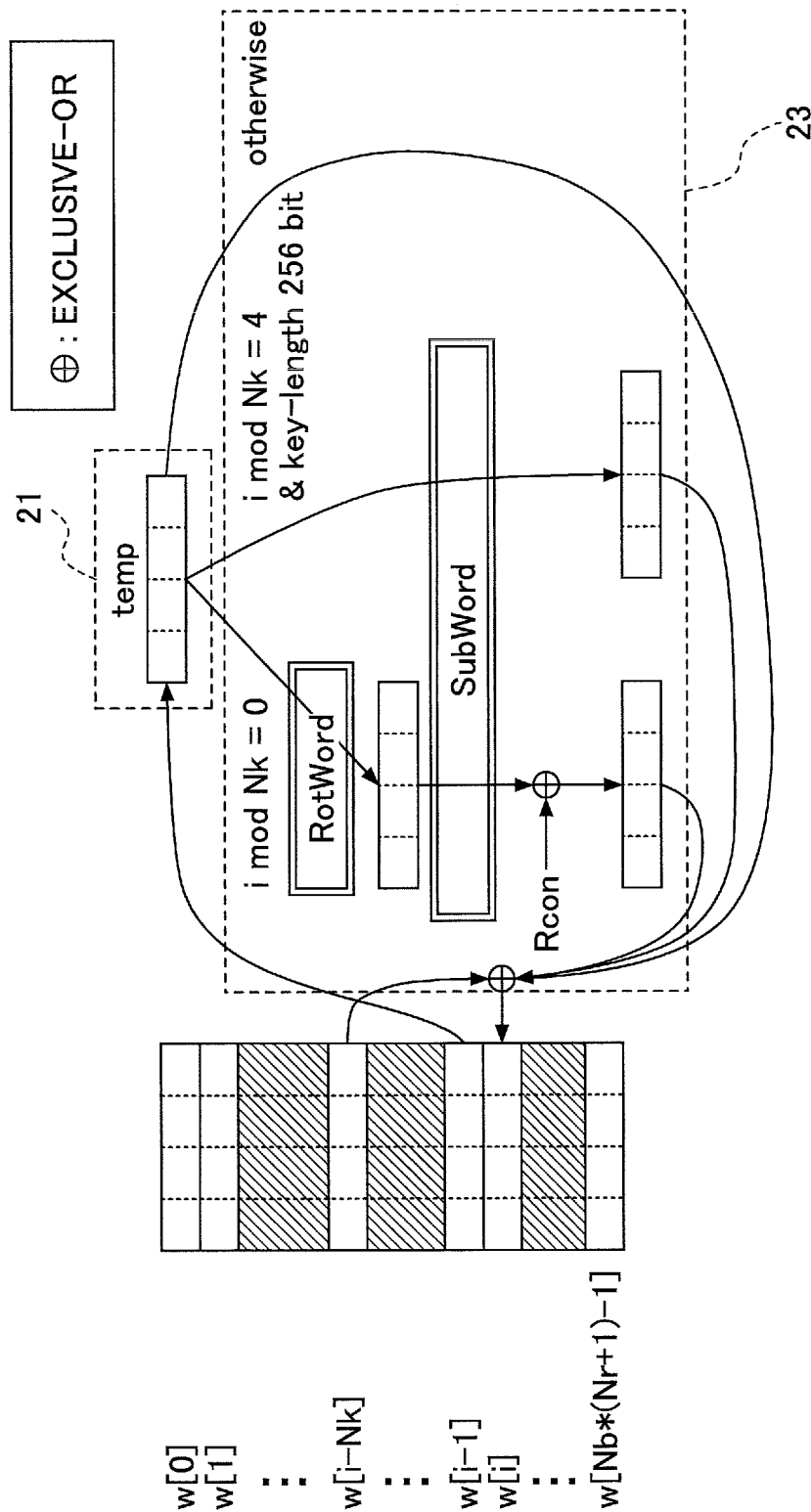
FIG. 2B is a drawing (2) illustrating an example of the process of generating round key data of the comparative example.

FIGS. 2A and 2B are drawings illustrating an example of the process of generating round key data according to a comparative example. Specifically, FIG. 2A illustrates source code for the purpose of explaining an example of the process of generating round key data of the comparative example. What is illustrated in FIG. 2A is taken from FIPS 197 (published in 2001 by the National Institute of Standards and Technology in the United States). FIG. 2B is an illustrative drawing showing a model of the process performed by the source code illustrated in FIG. 2A.

First source code 2 implements the process of generating round key data of the comparative example. The process of generating round key data of the comparative example is performed with respect to each data that is input into "temp" 21 which is a memory area. A first process 22 of the first source code 2 serves to perform 4-byte-by-4-byte substitution in order to substitute the input data of an array "key" for an array "w" when the array "key" is declared as having a one-byte memory area as indicated by "byte" and the array "key" is declared as having a four-byte memory area as indicated by "word".

The "temp" 21 is a variable declared as "word", i.e., a four-byte memory area. The first source code 2 has a second process 23 that is performed to derive round key data for each "temp" 21. The second process 23 includes a process based on a "RotWord" function that performs the rotation shift for shifting four-byte input data to the right by 8 bits and moving the 8 overflown lower bits resulting from the right shift to the 8 upper bits. "RotWord" will hereinafter be used to refer to the above-noted function.

The second process 23 performs a process based on a "SubWord" function that performs a "SubBytes" process with respect to each one-byte data of the four-byte input data. "SubWord" will hereinafter be used to refer to the above-noted function. A description of "SubBytes" will be given later.

In the first source code 2, "Nk" is a variable that has a value indicative of the length of input key data. "Nk" will hereinafter be used to refer to the above-noted variable.

In the first source code 2, "Nb" is a variable that has a value indicative of a block length of data subjected to encryption and decryption. AES uses "Nb" that is 4, which indicates 128 bits. "Nb" will hereinafter be used to refer to the above-noted variable.

In the first source code 2, "Nr" is a variable that has a value indicative of a round number. "Nr" used in AES corresponds to the length of key data. The value of "Nr" is equal to 10 to indicate 128 bits, 12 to indicate 192 bits, and 14 to indicate 256 bits. "Nr" will hereinafter be used to refer to the above-noted variable.

In the first source code 2, "Rcon" is the function to calculate a four-byte round number for use in the arithmetic operation in the case of the variable "i" being an integer multiple of "Nk". The one upper byte of the value calculated by "Rcon" may be expressed by the following formula (1). "Rcon" will hereinafter be used to refer to the above-noted function.

[Expression 1]

$$2^{i/Nk} \in GF(2^8), \text{otherwise } 0 \qquad \text{(formula 1)}$$

<Example of Generation of Round Key Data>

FIGS. 3A, 3B and 3C are drawings illustrating an example of the process of generating round key data according to an embodiment of the present invention. Specifically, FIG. 3A illustrates source code for the purpose of explaining an example of the process of generating round key data according to the embodiment of the present invention. FIG. 3B is an illustrative drawing showing a model of the process performed by the source code illustrated in FIG. 3A. Further, FIG. 3C is an illustrative drawing showing a model of another example of the process of generating round key data according to the embodiment of the present invention.

Second source code 3 implements the process of generating round key data as does the first source code 2 illustrated in FIG. 2A.

With a third process 31, the embedded system 1 processes the four-byte data input into the "temp" 21 on a one-byte-by-one-byte basis. Further, the third process 31 serves to generate round key data for each byte. As is illustrated, the process of generating round key data performs a process based on the "SubBytes" function and a process based on the "Rcon" function in place of a process based on the "Rot-Word" function and a process based on "SubWord" function illustrated in FIG. 2A.

The process of generating round key data may be implemented by use of the method illustrated in FIG. 3C. In FIG. 3C, the process of generating round key data uses a one-byte array "r" 32 in place of the four-byte array "w" illustrated in FIG. 3B. With the input data of the array "r" 32 being one byte, the third process 31 is performed on a one-byte-by-one-byte basis with respect to the array "r" 32.

Performing the process of generating round key data on a one-byte-by-one-byte basis with respect to four-byte data allows the embedded system 1 to process the input data on a byte-specific basis. The four-byte data may include unneeded data. In such a case, the embedded system 1 performing a byte-specific process is able to avoid processing unneeded data, thereby improving the processing speed.

In FIG. 3C, the embedded system 1 enables the sharing of codes for accessing the array "r" 32 between different conditions, resulting in the amount of source code descriptions being reduced, so that the embedded system 1 enables the reduction of program data size.

<Comparative Example of Entire Process of Encryption and Decryption>

Figure 4C:
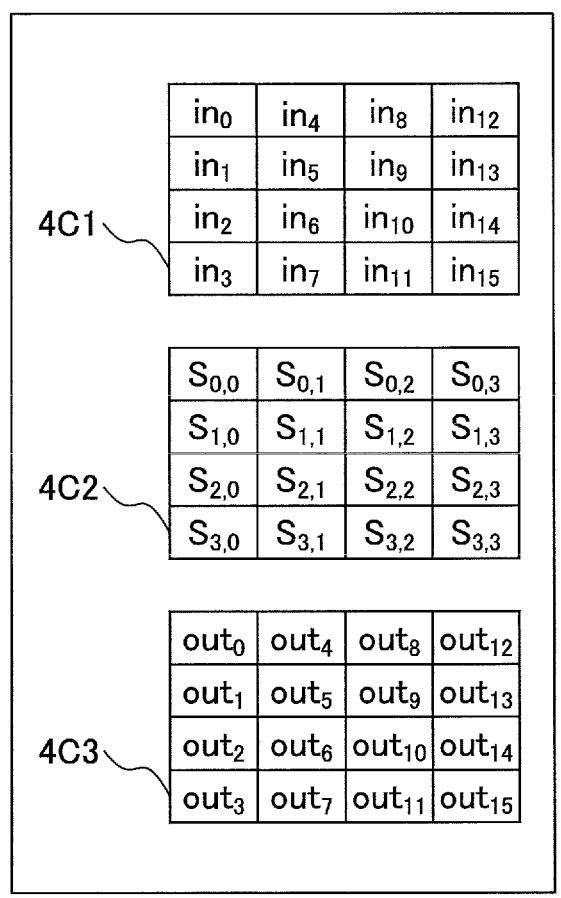
FIG. 4C is a drawing (3) illustrating an example of the process for encryption and decryption of the comparative example.

FIGS. 4A, 4B and 4C are drawings illustrating examples of encryption and decryption processes of the comparative example. What is illustrated in FIGS. 4A, 4B and 4C are taken from FIPS 197 (published in 2001 by the National Institute of Standards and Technology in the United States).

Specifically, FIG. 4A illustrates source code for the purpose of explaining an example of the encryption process of the comparative example.

Fourth source code 4A implements the process of encrypting input data 4A1 to generate output data 4A2. Further, the encryption process is performed on a unit-by-unit basis where one unit is one round of the encryption process 42 in FIG. 4A.

FIG. 4B illustrates source code for the purpose of explaining an example of the decryption process of the comparative example.

Fifth source code 4B implements the process of decrypting input data 4B1 to generate output data 4B2. Further, the decryption process is performed on a unit-by-unit basis where one unit is a four-byte process in one round of the decryption process 43 in FIG. 4B.

In the fourth source code 4A and the fifth source code 4B, the input data 4A1 and the input data 4B1 are input on a one-byte-by-one-byte basis into a "state" 41 that is block data having 4 rows and 4 columns, and are then processed.

FIG. 4C is an illustrative drawing showing an example of data formats used in the comparative example.

Input data 4C1 is either one of the input data 4A1 illustrated in FIG. 4A and the input data 4B1 illustrated in FIG. 4B. Output data 4C3 is either one of the output data 4A2 illustrated in FIG. 4A and the output data 4B2 illustrated in FIG. 4B.

In the comparative example, the two-dimensional data "state" comprised of 4 rows and 4 columns are subjected to processing, thereby converting the input data 401 into the output data 4C3.

The encryption process of the comparative example is implemented by the "AddRoundKey" function, the "Sub-Bytes" function, the "ShiftRows" function, and the "Mix-Columns" function as illustrated in FIG. 4A.

The decryption process of the comparative example is implemented by the "AddRoundKey" function, the "Inv-SubBytes" function, the "InvShiftRows" function, and the "InvMixColumns" function as illustrated in FIG. 4B.

The "InvSubBytes" function is the inverse function of the "SubBytes" function. Further, the "InvShiftRows" function is the inverse function of the "ShiftRows" function. Moreover, the "InvMixColumns" function is the inverse function of the "MixColumns" function.

<Example of One-Dimensional Array>

FIG. 5 is a drawing illustrating an example of a one-dimensional array of input data according to the embodiment of the present invention.

Specifically, the one-dimensional array "S" is a one-dimensional array that stores 16 data items each of which is one byte. With this arrangement, the embedded system 1 performs each of the encryption process and the decryption process with respect to the one-dimensional array "S" on a data-item-specific basis.

<Example of Encryption and Decryption>

Figure 6A:
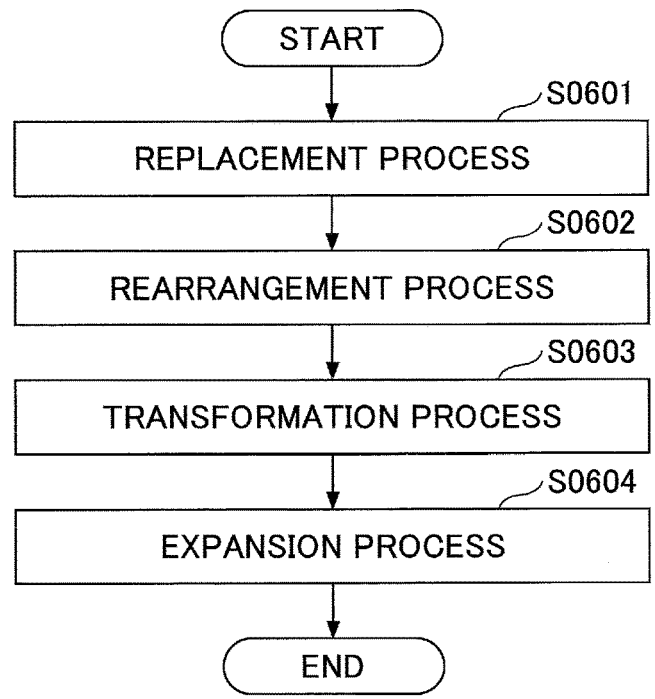
FIG. 6A is a flowchart (1) illustrating an example of the process for one round of encryption according to the embodiment of the present invention.
Figure 6B:
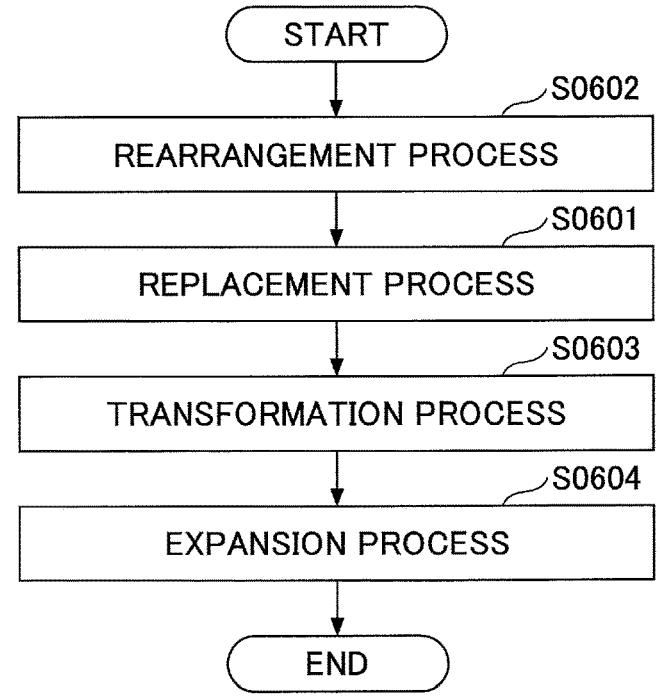
FIG. 6B is a flowchart (2) illustrating an example of the process for one round of encryption according to the embodiment of the present invention.

FIGS. 6A and 6B are flowcharts illustrating examples of one round of the encryption process according to the embodiment of the present invention.

In one round of the encryption process, either the process illustrated in FIG. 6A or the process illustrated in FIG. 6B is performed. In the following, a description will be given by using the process illustrated in FIG. 6A as an example. The process illustrated in FIG. 6B has a different order of process steps than the process illustrated in FIG. 6A. In the process illustrated in FIG. 6B, the process step having the same name and the same reference numeral as in FIG. 6A performs the same process step as in FIG. 6A. Each of the processes illustrated in FIG. 6A and FIG. 6B corresponds to a process performed for one round by the code of the encryption process 42 illustrated in FIG. 4A.

In step S0601, the embedded system 1 performs a byte substitution transformation for performing byte substitution for data. The details of the byte substitution transformation will be described later.

In step S0602, the embedded system 1 performs a row shift transformation for performing row shifting for data. The details of the row shift transformation will be described later.

In step S0603, the embedded system 1 performs a column mix transformation for performing column mixing for data. The details of the column mix transformation will be described later.

In step S0604, the embedded system 1 performs a key add transformation for data based on round key data. The round key data is generated by the processing of generating round key data, for example. The details of the key add transformation will be described later.

Figure 7A:
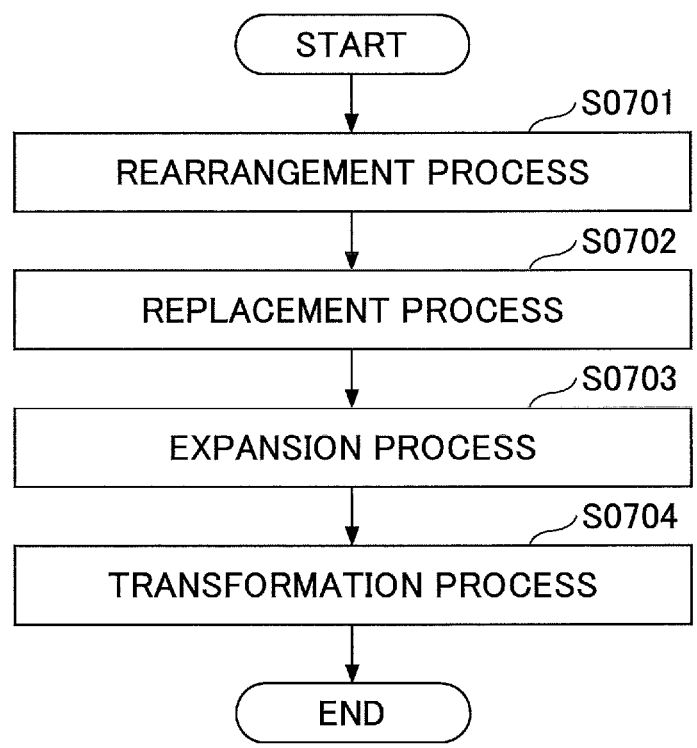
FIG. 7A is a flowchart illustrating an example of a four-byte process in one round of decryption according to the embodiment of the present invention.

FIGS. 7A and 7B are a flowchart and source code, respectively, illustrating examples of a four-byte process in one round of the decryption process according to the embodiment of the present invention. Specifically, FIG. 7A is a flowchart illustrating an example of a four-byte process in one round of the decryption process according to the embodiment of the present invention. The process illustrated in FIG. 7A corresponds to the process performed by the code of the decryption process 43 for 4 bytes in the 16 bytes of one round illustrated in FIG. 4B.

In step S0701, the embedded system 1 performs a row shift transformation for performing row shifting for data. When data encrypted by the process illustrated in FIG. 6A or FIG. 6B is input, the process of step S0701 is implemented as the inverse function of the function used in step S0602 illustrated in FIG. 6A and FIG. 6B, for example.

In step S0701, the embedded system 1 performs a byte substitution transformation for performing byte substitution for data. When data encrypted by the process illustrated in FIG. 6A or FIG. 6B is input, the process of step S0702 is implemented as the inverse function of the function used in step S0601 illustrated in FIG. 6A and FIG. 6B, for example.

In step S0703, the embedded system 1 performs a key add transformation for data based on round key data.

In step S0704, the embedded system 1 performs a column mix transformation for performing column mixing for data. When data encrypted by the process illustrated in FIG. 6A or FIG. 6B is input, the process of step S0704 is implemented as the inverse function of the function used in step S0603 illustrated in FIG. 6A and FIG. 6B, for example.

FIG. 7B illustrates an example of the source code of a four-byte process in one round of the decryption process according to the embodiment of the present invention.

The four-byte process in one round of decryption may be implemented by use of decryption source code 10, for example. The decryption source code 10 is an example of the decryption process for four-byte data 10IN.

In the decryption source code 10, the embedded system 1 performs, with respect to the four-byte data 10IN, the "InvShiftRows" function 10Fun1 that is an example of the row shift transformation. The process performed by the "InvShiftRows" function 10Fun1 corresponds to the process performed in step S0701 illustrated in FIG. 7A.

Further in the decryption source code 10, the embedded system 1 performs, with respect to the data generated by the "InvShiftRows" function 10Fun1, the "InvSubBytes" function 10Fun2 that is an example of the byte substitution transformation. The process performed by the "InvSubBytes" function 10Fun2 corresponds to the process performed in step S0702 illustrated in FIG. 7A.

Further in the decryption source code 10, the embedded system 1 performs, with respect to the data generated by the "InvSubBytes" function 10Fun2, a process defined by key add transformation code 1001 that is an example of the key add transformation. The process performed by the key add transformation code 1001 corresponds to the process performed in step S0703 illustrated in FIG. 7A.

Further in the decryption source code 10, the embedded system 1 performs, with respect to the data generated by the process of the key add transformation code 1001, a process defined by column mix transformation code 1002 that is an example of the column mix transformation. The process performed by the column mix transformation code 1002 corresponds to the process performed in step S0704 illustrated in FIG. 7A.

With the implementation of source code as illustrated in FIG. 4B in which the encryption process is performed by use of a one-dimensional array on a four-byte-by-four-byte basis, the embedded system 1 enables the reduction of program data size by reducing the amount of description of source code for the decryption process. With the implementation of source code as illustrated in FIG. 4B in which the encryption process is performed by use of a one-dimensional array on a four-byte-by-four-byte basis, further, the embedded system 1 enables fast processing of decryption arithmetic operations.

In the following, a description will be given by use of the decryption process as an example.

The entire processes of encryption and decryption are not limited to the processes illustrated in FIG. 6A and FIG. 7A, respectively. The encryption process, for example, may have step S0601 and step S0602 reversed in order, as illustrated in FIG. 6B, from the entire process illustrated in FIG. 6A.

<Example of Key Add Transformation>

FIG. 8 illustrates source code showing an example of the key add transformation for encryption or decryption according to the embodiment of the present invention.

The key add transformation is the process performed in step S0604 illustrated in FIG. 6A and FIG. 6B and the process performed in step S0703 illustrated in FIG. 7A. The key add transformation is implemented by sixth source code 6, for example.

The embedded system 1 performs the key add transformation by performing an exclusive-OR operation between an array "ADKin" 61, which is an input into the key add transformation, and an array "KD" 62, which has round key data stored therein as an input into the key add transformation. The result of performing the key add transformation is an array "ADKout" 64, for example. The round key data stored in the array "KD" 62 are the data generated by the process of generating round key data, for example. It may be noted that the operator "^" appearing in the sixth source code 6 refers to an exclusive-OR operation. The operator "^" will hereinafter be used in the same manner to refer to an exclusive-OR operation.

A variable "cnt" in the sixth source code 6 is for the purpose of performing a count-up. The variable "cnt" will hereinafter be used in the same manner to refer to a variable for such a purpose. The variable "cnt" in the sixth source code 6 may take a value ranging from 0 to 15.

A variable "ROU" in the sixth source code is for the purpose of indicating a value determined based on the length of the key. In the case of the length of the key being 128 bits, for example, the variable "ROU" takes a value ranging from 0 to 10.

FIG. 9 is a drawing illustrating an example of the result of performing the key add transformation for encryption or decryption according to the embodiment of the present invention. Specifically, FIG. 9 is a drawing showing the graphic illustration of the result of the key add transformation performed by use of the sixth source code 6 illustrated in FIG. 8. What is illustrated in FIG. 9 is taken from FIPS 197 (published in 2001 by the National Institute of Standards and Technology in the United States).

Performing the key add transformation by use of one-dimensional array data, i.e., the array "ADKin" 61 illustrated in FIG. 8, the embedded system 1 is able to produce the same result as the arithmetic operation performed by use of the exclusive-OR operation between the two-dimensional-array round key data and the two-dimensional-array input data having 4 rows and 4 columns as illustrated in FIG. 9.

Because of the use of a one-dimensional array input, the embedded system 1 enables processing of the key add transformation with a small amount of program code like the sixth source code 6 illustrated in FIG. 8. Accordingly, the embedded system 1 is able to reduce program data size by use of the key add transformation performed by the sixth source code 6 illustrated in FIG. 8.

<Example of Row Shift Transformation>

The row shift transformation is the process performed in step S0602 illustrated in FIG. 6A and FIG. 6B and the process performed in step S0701 illustrated in FIG. 7A. The row shift transformation is implemented by the "InvShiftRows" function 10Fun1 appearing in the decryption source code 10 illustrated in FIG. 7B, for example.

Figures 10A, 10B, 10C:
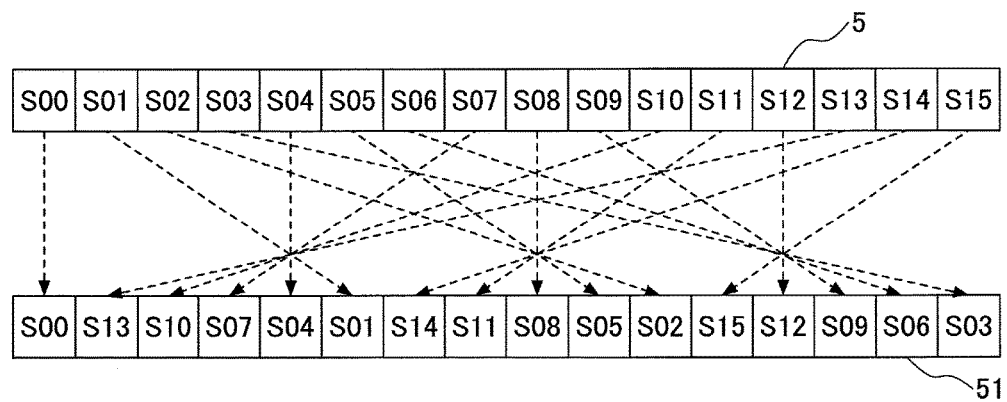
FIG. 10A is a drawing (1) illustrating an example of the row shift transformation for decryption according to the embodiment of the present invention.
FIG. 10B is a drawing (2) illustrating an example of the row shift transformation for decryption according to the embodiment of the present invention.
FIG. 10C is a drawing (3) illustrating an example of the row shift transformation for decryption according to the embodiment of the present invention.

FIGS. 10A, 10B and 100 are drawings illustrating an example of the row shift transformation for decryption according to the embodiment of the present invention. Specifically, FIG. 10A illustrates source code for explaining an example of a row shift table used in the row shift transformation for decryption according to the embodiment of the present invention.

The row shift transformation serves to perform row shifting with respect to data. Row shifting is implemented by use of a row shift table, for example. The row shift table is one-dimensional array data illustrated as seventh source code 7, for example.

FIG. 10B is a drawing illustrating an example of the row shift transformation performed by the row shift table of the seventh source code 7 for decryption according to the embodiment of the present invention. The row shift table is one-dimensional array data that specifies the ordinal position that the input data holds in the shifted sequence.

After the one-dimensional array "S" 5 illustrated in FIG. 5 is subjected to the row shift transformation performed by the row shift table shown in the seventh source code 7, the one-dimensional array "S" 5 observed prior to the row shift transformation is converted into a row-shifting-performed array 51.

FIG. 10C illustrates source code showing an example of the row shift transformation for decryption according to the embodiment of the present invention.

Eighth source code 8 implements the row shift transformation for decryption. An array "ISRin" 81 is an array that is input into the row shift transformation. The array "ISRin" 81 corresponds to the one-dimensional array "S" 5 illustrated in FIG. 10B that is observed prior to the row shift transformation.

The array "ISRin" 81 is subjected to the row shift transformation performed by the "InvShiftRows" function to become an array that is output as an array "ISRout" 82. The array "ISRout" corresponds to the row-shifting-performed array 51 illustrated in FIG. 10B.

Figure 11A:
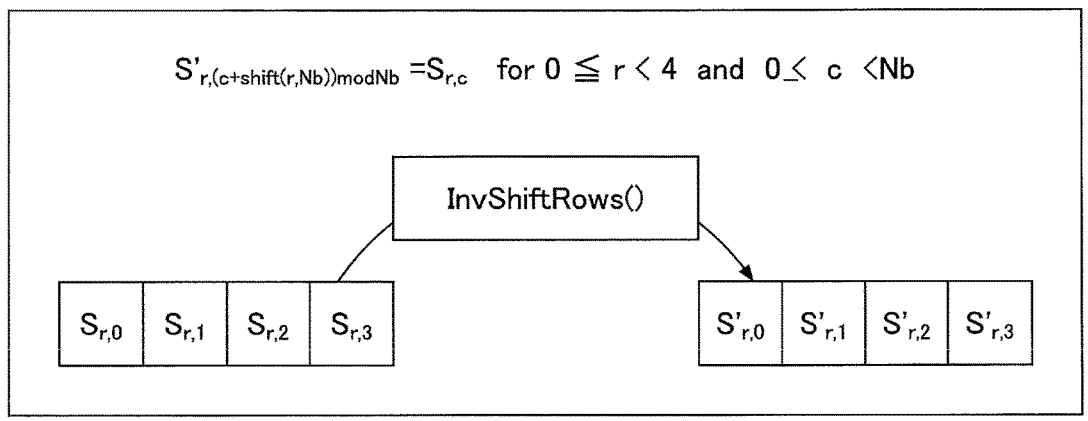
FIG. 11A is a drawing (1) illustrating an example of the result of performing the row shift transformation for decryption according to the embodiment of the present invention.
Figure 11B:
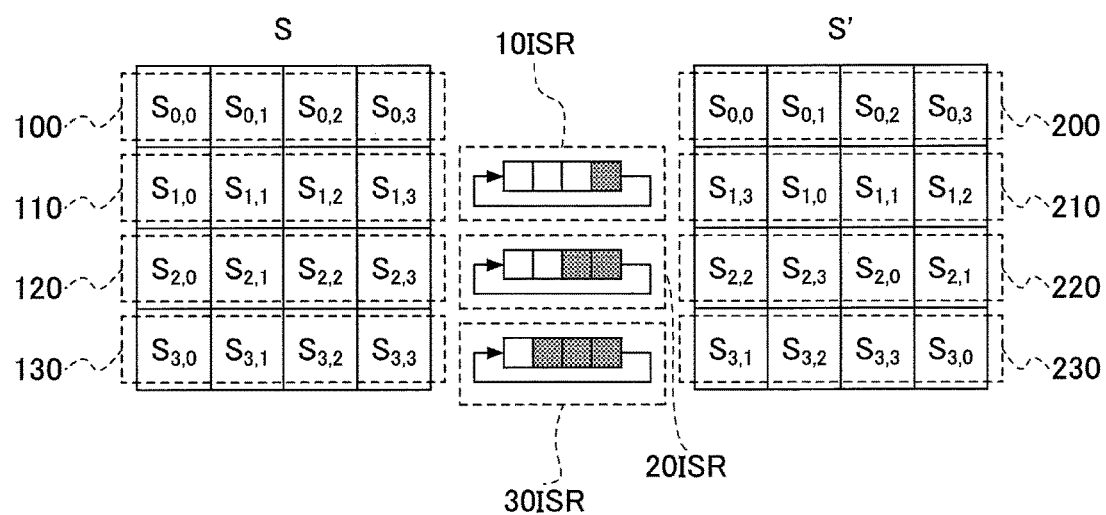
FIG. 11B is a drawing (2) illustrating an example of the result of performing the row shift transformation for decryption according to the embodiment of the present invention.

FIGS. 11A and 11B are drawings illustrating an example of the result of performing the row shift transformation for decryption according to the embodiment of the present invention. FIG. 11A and FIG. 11B illustrate the graphic illustration of the result of the row shift transformation performed by the eighth source code 8 illustrated in FIG. 10C. What is illustrated in FIG. 11A and FIG. 11B is taken from FIPS 197 (published in 2001 by the National Institute of Standards and Technology in the United States).

The row shift transformation is equivalent to the process that shifts data in the r-th row to the right by r column positions in the two-dimensional array.

First, the row shift transformation does not shift original data 100 in the 0-th row, thereby outputting processed data 200 in the 0-th row that has the same data arrangement as the input.

Next, the row shift transformation shifts original data 110 in the 1-st row to the right by one column position, thereby outputting processed data 210 in the 1-st row. The process that shifts the original data 110 in the 1-st row to the right by one column position is illustrated by graphic illustration 10ISR. The graphic illustration 10ISR shows the process of shifting data at the 0-th column to the 1-st column, shifting data at the 1-st column to the 2-nd column, shifting data at the 2-nd column to the 3-rd column, and shifting data at the 3-rd column to the 0-th column, which is known as a rotation shift process with the right shift by one column.

Further, the row shift transformation shifts original data 120 in the 2-nd row to the right by two column positions, thereby outputting processed data 220 in the 2-nd row. The process that shifts the original data 120 in the 2-nd row to the right by two column positions is illustrated by graphic illustration 20ISR. The graphic illustration 20ISR shows the process of shifting data at the 0-th column to the 2-nd column, shifting data at the 1-st column to the 3-rd column, shifting data at the 2-nd column to the 0-th column, and shifting data at the 3-rd column to the 1-st column, which is known as a rotation shift process with the right shift by two columns.

Moreover, the row shift transformation shifts original data 130 in the 3-rd row to the right by three column positions, thereby outputting processed data 230 in the 3-rd row. The process that shifts the original data 130 in the 3-rd row to the right by three column positions is illustrated by graphic illustration 30ISR. The graphic illustration 30ISR shows the process of shifting data at the 0-th column to the 3-rd column, shifting data at the 1-st column to the 0-th column, shifting data at the 2-nd column to the 1-st column, and shifting data at the 3-rd column to the 2-nd column, which is known as a rotation shift process with the right shift by thee columns.

Performing the row shift transformation by using one-dimensional array data as the row shift table, the embedded system 1 is able to produce the same process result as the result of shifting data in the r-th row to the right by r column positions with respect to a two-dimensional input array having 4 rows and 4 columns as illustrated in FIG. 11A and FIG. 11B.

Because of the use of a one-dimensional array input, the embedded system 1 enables processing of the row shift transformation with a small amount of program code like the eighth source code 8 illustrated in FIG. 10C. Accordingly, the embedded system 1 is able to reduce program data size by use of the row shift transformation performed by the eighth source code 8 illustrated in FIG. 10C.

The row shift transformation described in connection with FIG. 10A, FIG. 10B, FIG. 10C, FIG. 11A and FIG. 11B may alternatively be the process of its inverse function. The "ShiftRows" function used for encryption that is the inverse function of the "InvShiftRows" function 10Fun1 described in connection with FIG. 10A, FIG. 10B and FIG. 10C performs the process that turns the row-shifting-performed array 51 illustrated in FIG. 10B into the one-dimensional array "S" 5 observed prior to the row shift transformation. Namely, the row shift transformation may be equivalent to the process that shifts data in the r-th row to the left by r column positions in a two-dimensional array. Further, the "ShiftRows" function utilizes a row shift table in the same manner as the "InvShiftRows" function. The values of the row shift table used in the "ShiftRows" function are changed from the values used in the "InvShiftRows" function by taking into account the shifting of ordinal positions.

<Example of Byte Substitution Transformation>

The byte substitution transformation is the process performed in step S0601 illustrated in FIG. 6A and FIG. 6B and the process performed in step S0702 illustrated in FIG. 7A. The byte substitution transformation is implemented by the column mix transformation code 10C2 appearing in the decryption source code 10 illustrated in FIG. 7B, for example.

Figure 12B:
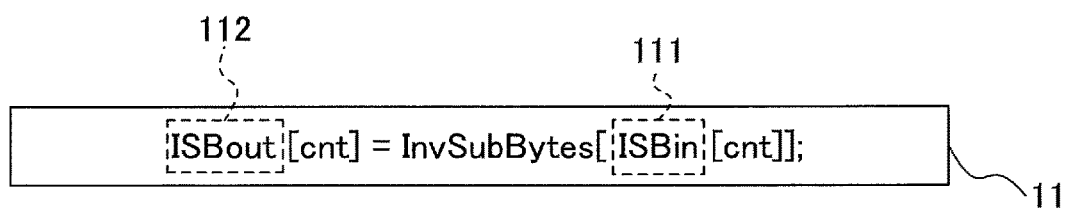
FIG. 12B is a source code (2) illustrating an example of the byte substitution transformation for decryption according to the embodiment of the present invention.

FIGS. 12A and 12B are drawings illustrating an example of the byte substitution transformation for decryption according to the embodiment of the present invention. Specifically, FIG. 12A illustrates source code for explaining an example of a byte substitution table used in the byte substitution transformation for decryption according to the embodiment of the present invention.

The byte substitution transformation serves to substitute data. The byte substitution transformation is implemented by a byte substitution table, for example. The byte substitution table is one-dimensional array data illustrated as ninth source code 9, for example. In the case of the input data being provided on a one-byte-by-one-byte basis and having 256 bits in total, the ninth source code is one-dimensional array data having 256 data elements. The byte substitution transformation serves to convert a value between 0 and 255 input as a parameter into the "InvSubBytes" function into a value stored in the byte substitution table, for example.

FIG. 12B illustrates source code showing an example of the byte substitution transformation for decryption according to the embodiment of the present invention.

Tenth source code 11 implements the byte substitution transformation for decryption. An array "ISBin" 111 is an array that is input into the byte substitution transformation. The value input into the array "ISBin" 111 is subjected to the byte substitution transformation by the "InvSubBytes" function to become a value output as an array "ISBout" 112.

Figure 13:
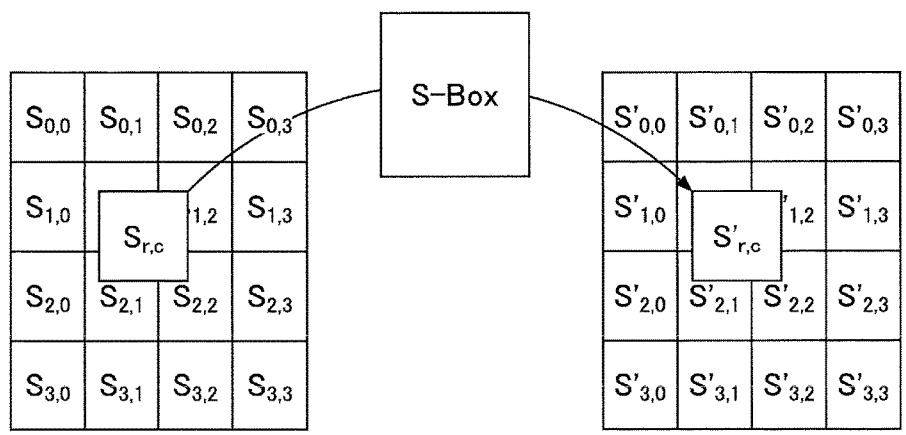
FIG. 13 is a drawing illustrating an example of the result of performing the byte substitution transformation for decryption according to the embodiment of the present invention.

FIG. 13 is a drawing illustrating an example of the result of performing the byte substitution transformation for decryption according to the embodiment of the present invention. Specifically, FIG. 13 is a drawing showing the graphic illustration of the result of the byte substitution transformation performed by use of the tenth source code 11 illustrated in FIG. 12B. What is illustrated in FIG. 13 is taken from FIPS 197 (published in 2001 by the National Institute of Standards and Technology in the United States).

The byte substitution transformation is able to derive the same process result as the process performed by the S-BOX defined in FIPS 197 5.1.1. The process performed by the S-BOX is the byte substitution transformation using the illustrated table.

Performing the byte substitution transformation by using one-dimensional array data as the byte substitution table, the embedded system 1 is able to derive the same process result as the process performed by the S-BOX illustrated in FIG. 13.

Because of the use of a one-dimensional array as an input, the embedded system 1 which uses the tenth source code 11 illustrated in FIG. 12B enables the realization of a byte substitution transformation with the amount of program code similar to that of the process of the S-BOX. Further, the embedded system 1 performs the byte substitution transformation based on the one-dimensional array having a one-byte input to enable fast processing to produce the same processing results as the S-BOX. Moreover, the embedded system 1 is easy to implement because the byte substitution transformation is based on the one-dimensional array having a one-byte input. Accordingly, the embedded system 1 is able to reduce program data size and to achieve fast processing by use of the byte substitution transformation performed by the tenth source code 11 illustrated in FIG. 12B.

The byte substitution transformation described in connection with FIG. 12A, FIG. 12B and FIG. 13 may be the process performed by its inverse function. The "SubByte" function, which is used in encryption as the inverse function of the "InvSubBytes" function described in connection with FIG. 12A and FIG. 12B, performs byte substitution in the reverse order to the process of the S-BOX described in connection with FIG. 13. Namely, the byte substitution transformation may be the process in which the input and the output are swapped relative to those of the process of the S-BOX. Further, the "SubByte" function utilizes a byte substitution table in the same manner as the "InvSubBytes" function. The values of the byte substitution table used in the "SubBytes" function are changed from the values used in the "InvSubBytes" function by taking into account substituted values.

<Example of Column Mix Transformation>

The column mix transformation is the process performed in step S0603 illustrated in FIG. 6A and FIG. 6B and the process performed in step S0704 illustrated in FIG. 7A. The column mix transformation is implemented by the "InvSubBytes" function 10Fun2 appearing in the decryption source code 10 illustrated in FIG. 7B, for example.

FIG. 14 illustrates source code showing an example of the column mix transformation for decryption according to the embodiment of the present invention.

The column mix transformation serves to transform data. The column mix transformation is implemented by equivalent expressions, for example. The equivalent expressions are implemented by eleventh source code 12, for example.

As illustrated in the eleventh source code 12, the equivalent expressions are such that an exclusive-OR operation is performed between "in[0]" and "in[1]" that are input into the column mix transformation, and the result of the operation is substituted into a variable "in1_01". Similarly, the equivalent expressions are such that an exclusive-OR operation is performed between "in[2]" and "in[3]" that are input into the column mix transformation, and the result of the operation is substituted into a variable "in1_23".

Next, the equivalent expressions are such that an "IRPLY" function having the variable "in1_01" as a parameter is performed, and the result of the operation is substituted into a variable "in2_01". Further, the equivalent expressions are such that the "IRPLY" function having the result of performing an exclusive-OR operation between "in[1]" and "in[2]" as a parameter is performed, and the result of the operation is substituted into a variable "in2_12". Further, the equivalent expressions are such that an "IRPLY" function having the variable "in1_23" as a parameter is performed, and the result of the operation is substituted into a variable "in2_23". Moreover, the equivalent expressions are such that the "IRPLY" function having the result of performing an exclusive-OR operation between "in[3]" and "in[0]" as a parameter is performed, and the result of the operation is substituted into a variable "in2_30".

The "IRPLY" function is defined by twelfth source code 13, for example. Specifically, as illustrated in the twelfth source code 13, the "IRPLY" function is implemented as the combination of two shift operations, an exclusive-OR operation, and mapping by a table "Irply".

Further, the equivalent expressions are such that the "IRPLY" function having the result of performing an exclusive-OR operation between the variable "in2_01" and the variable "in2_12" as a parameter is performed, and the result of the operation is substituted into a variable "in4_02". Further, the equivalent expressions are such that the "IRPLY" function having the result of performing an exclusive-OR operation between the variable "in2_12" and the variable "in2_23" as a parameter is performed, and the result of the operation is substituted into a variable "in4_13".

In the equivalent expressions, subsequently, the "IRPLY" function having the result of performing an exclusive-OR operation between the variable "in4_02" and the variable "in4_13" is performed. In the equivalent expressions, further, the result of performing exclusive-OR operations between the processing result of the "IRPLY" function, the variable "in1_01", and the variable "in1_23" is substituted into a variable "in9_0123".

In the equivalent expressions, moreover, the result of performing exclusive-OR operations between the variable "in9_0123", the variable "in4_02", the variable "in2_01", and "in[0]" is obtained as "out[0]". In the equivalent expressions, further, the result of performing exclusive-OR operations between the variable "in9_0123", the variable "in4_13", the variable "in2_12", and "in[1]" is obtained as "out[1]". In the equivalent expressions, moreover, the result of performing exclusive-OR operations between the variable "in9_0123", the variable "in4_02", the variable "in2_23", and "in[2]" is obtained as "out[2]". In the equivalent expressions, further, the result of performing exclusive-OR operations between the variable "in9_0123", the variable "in4_13", the variable "in2_30", and "in[3]" is obtained as "out[3]".

FIGS. 15A, 15B, 15C, 15D, and 15E are drawings illustrating an example of the result of the column mix transformation for decryption according to the embodiment of the present invention. What is illustrated in FIGS. 15A, 15B, 15C, 15D, and 15E are taken from FIPS 197 (published in 2001 by the National Institute of Standards and Technology in the United States). Specifically, FIG. 15A is a drawing showing the graphic illustration of the result of the column mix transformation performed by use of the eleventh source code 12 illustrated in FIG. 14. FIG. 15B illustrates an example of source code for performing calculation illustrated in FIG. 15A. The process illustrated in FIG. 15A is expressed as the process performed by the source code illustrated in FIG. 15B, for example. Multiplication operations appearing in the source code illustrated in FIG. 15B are defined by source code illustrated in FIG. 15C. Accordingly, each calculation appearing in the source code illustrated in FIG. 15B is expressed as illustrated in FIG. 15D based on FIG. 15C.

In the arithmetic operation using the "IRPLY" function, the following formula (2) is satisfied.

$$z = x \hat{\ } y \quad \text{Expression 2}$$

$$\text{IRPLY}(z) = \text{IRPLY}(x) \hat{\ } \text{IRPLY}(y) \quad \text{(formula 2)}$$

The embedded system 1 utilizes equivalent arithmetic operations using the "IRPLY" function based on the above-noted formula (2) to enable high-speed arithmetic computations with a small amount of code.

The calculations performed by the source code illustrated in FIG. 15B are expressed as in FIG. 15E based on the above-noted formula (2). Calculations of "out[0]", "out[1]", "out[2]", and "out[3]" illustrated in FIG. 15E include a portion that performs the same calculation. The eleventh source code 12 illustrated in FIG. 14 is an example in which the portion that performs the same calculation is performed by use of a variable such as the variable "in1_01".

In the eleventh source code 12, the use of such variables enables the sharing of results of duplicated computations. The sharing of computation results allows the embedded system to reduce the amount of code necessary for computation. Because of this, the eleventh source code 12 enables the realization of the process illustrated in FIG. 15A by use of a program with a small amount of code.

The column mix transformation described in connection with FIG. 14, FIG. 15A, FIG. 15B, FIG. 15C, FIG. 15D and FIG. 15E may alternatively be the process of its inverse function. The "MixColumns" function, which is used in encryption as the inverse function of the function "InvMixColumns" that is an example of the column mix transformation described in connection with FIG. 14, performs inverse transformation relative to that described in connection with FIG. 15A, FIG. 15B, FIG. 15C, FIG. 15D and FIG. 15E. Namely, the column mix transformation may have the input and the output thereof swapped with each other. Further, the "MixColumns" function utilizes equivalent expressions in the same manner as the "InvMixColumn" function. The equivalent expressions used in the "MixColumns" function have values thereof changed from the values used in the "InvMixColumns" function by taking into account transformed values.

<Example of Process by Column Mix Table>

FIG. 16 is a drawing illustrating an example in which the column mix transformation for decryption according to the embodiment of the present invention is implemented by use of a column mix table.

The column mix table is one-dimensional array data illustrated in FIG. 16, for example. The "IRPLY" function used in the column mix transformation may be transformation by the column mix table "Irply" illustrated in FIG. 16 rather than transformation by the shift operations and the like shown in the twelfth source code 13 illustrated in FIG. 14.

The process performed by the column mix table is a single mapping process. Because of this, the embedded system using the column mix table "Irply" is able to perform faster processing than the process that is performed by using the "IRPLY" function appearing in the twelfth source code 13 illustrated in FIG. 14.

<Example of Result of Evaluation>

The program of the embodiment of the present invention is 1.6 kilobytes (Kbytes) more or less in data size. Because of this, the program of the embodiment of the present invention can be stored in one sector of a flash memory (registered trademark). Further, since the program of the embodiment of the present invention is 1.6 kilobytes more or less in data size, adding such a program to the memory area for storing drivers, maintenance software, OS or the like still allows the embedded system to store the program by use of a small number of sectors.

The sector area may be 4 kilobytes, and the data size of the program for AES may be 6 kilobytes. In such a case, one or two more sectors in the memory area are needed in order to store the program for AES in addition to drivers, maintenance software, and an OS. In comparison, the use of the program according to the embodiment of the present invention allows the embedded system to reduce the data size, thereby reducing the demand for memory areas.

<Example of Functional Configuration>

Figure 17:
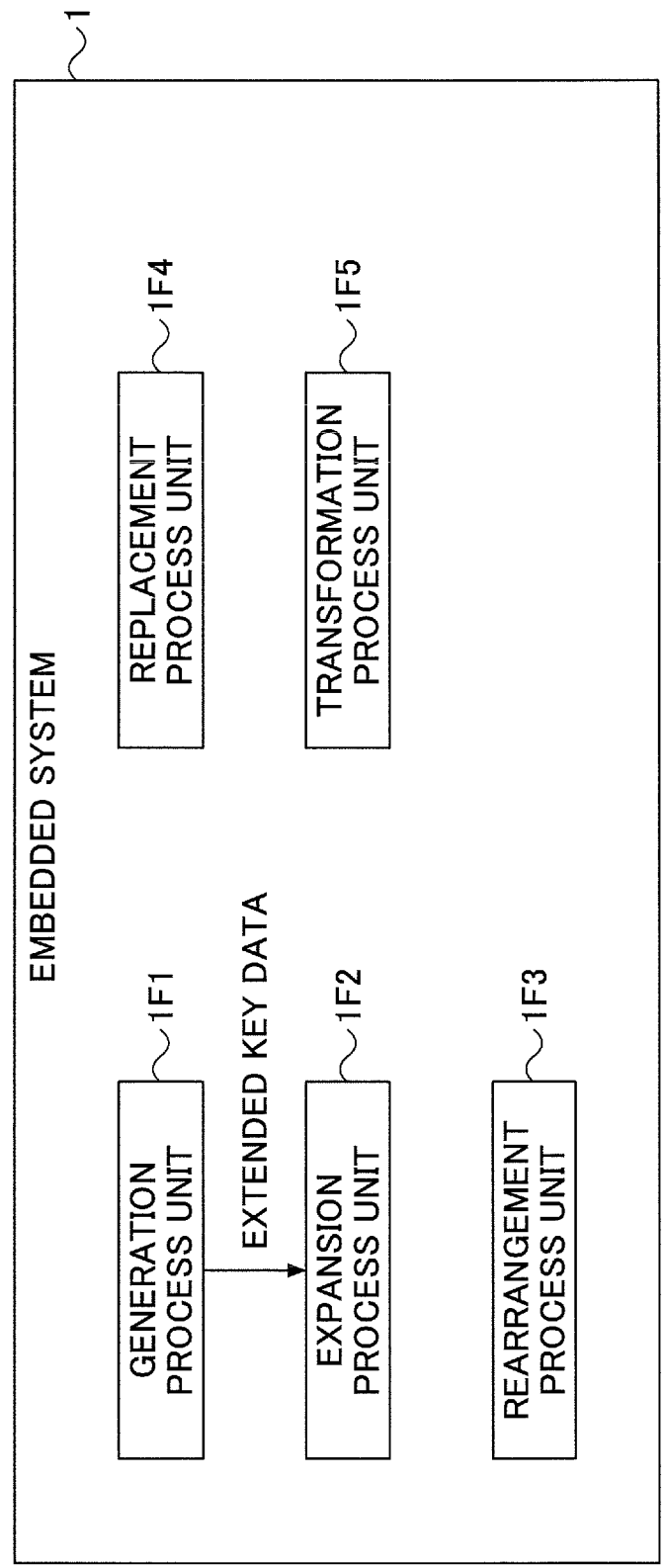
FIG. 17 is a functional block diagram illustrating an example of the functional configuration of the embedded system according to the embodiment of the present invention.

FIG. 17 is a functional block diagram illustrating an example of the functional configuration of the embedded system according to the embodiment of the present invention.

The embedded system 1 includes a generation process unit 1F1, an expansion process unit (i.e., a key add transformation unit) 1F2, a rearrangement process unit (i.e., row shift transformation unit) 1F3, a replacement process unit (i.e., byte substitution transformation unit) 1F4, and a transformation process unit (i.e., column mix transformation unit) 1F5.

The generation process unit 1F1 performs a process of generating round key data. The generation process unit 1F1 is implemented by the arithmetic unit 1H1 or the like illustrated in FIG. 1, for example. The round key data generated by the generation process unit 1F1 is used by the key add transformation unit 1F2.

The key add transformation unit 1F2 performs the key add transformation as illustrated in FIG. 3A, FIG. 3B, FIG. 3C and the like that is a process for performing key adding based on the round key data. The key add transformation unit 1F2 is implemented by the arithmetic unit 1H1 or the like illustrated in FIG. 1, for example.

The row shift transformation unit 1F3 performs the row shift transformation that is a process for performing row shifting for data. The row shift transformation unit 1F3 is implemented by the arithmetic unit 1H1 or the like illustrated in FIG. 1, for example.

The byte substitution transformation unit 1F4 performs the byte substitution transformation that is a process for performing byte substitution for data. The byte substitution transformation unit 1F4 is implemented by the arithmetic unit 1H1 or the like illustrated in FIG. 1, for example.

The column mix transformation unit 1F5 performs the column mix transformation that is a process for performing column mixing for data. The column mix transformation unit 1F5 is implemented by the arithmetic unit 1H1 or the like illustrated in FIG. 1, for example.

The embedded system 1 utilizes a one-dimensional array to enable the shared use of code between the cases of different conditions in the process of generating round key data, thereby reducing the amount of descriptions of source code to reduce program data size.

The use of a one-dimensional array in the embedded system 1 allows the key add transformation to be implemented with a small amount of code as in the case of the sixth source code 6 illustrated in FIG. 8. This reduces the amount of descriptions of source code to suppress program data size.

The use of a one-dimensional array in the embedded system 1 allows the row shift transformation to be implemented through a row shift table, thereby reducing the amount of descriptions of source code to suppress program data size.

The use of a one-dimensional array in the embedded system 1 allows the byte substitution transformation to be implemented through a byte substitution table, thereby reducing the amount of descriptions of source code to suppress program data size.

The use of a one-dimensional array in the embedded system 1 allows the computations of the column mix transformation to be implemented while enabling the sharing of computations, thereby reducing the amount of descriptions of source code to suppress program data size.

Accordingly, the embedded system 1 enables the reduction of program data size by performing at least one of the process of generating round key data, the key add transformation, the row shift transformation, the byte substitution transformation, and the column mix transformation of the embodiment of the present invention.

The embodiment is not limited the process for decryption. For example, the embodiment may be directed to encryption that uses the inverse functions of the respective processes.

Further, it is preferable for the embodiment to be applied to an embedded system for which many restrictions are imposed on the memory size to be used or the like. The embedded system preferably has such a hardware configuration that has a memory embedded in the arithmetic unit for the purpose of making it difficult for the program, data and the like of the embedded system to be deciphered.

All or part of the process relating to the embodiment of the present invention may be implemented as a program that is performed by a computer wherein such a program may be written in a legacy programming language or an object-oriented programming language such as assembler, C, C++, C#, and Java (registered trademark). Namely, the program is a computer program that causes a computer such as an information processing apparatus to perform all or part of each process relating to the embodiment of the present invention.

Such a program may be stored and distributed in a computer-readable recording medium such as a ROM, an EEPROM (electrically erasable programmable ROM), or the like. The recording medium may alternatively be an EPROM (erasable programmable ROM), a flash memory, a flexible disc, a CD-ROM, a CD-RW, a DVD-ROM, a DVD-RAM, a DVD-RW, a blue-ray disc, an SD (registered trademark) card, an MO, or the like. The program may also be distributed through electrical communication lines.

Further, although the preferred embodiments of the present invention have been described, the present invention is not limited to these particular embodiments, but various variations and modifications may be made without departing from the scope of the present invention described in the claims.

What is claimed is:

1. An information processing apparatus for encrypting data using AES, comprising:
   a memory; and
   an arithmetic unit coupled to the memory and configured to perform:
   a process of generating round key data on a one-byte-by-one-byte basis with respect to a first one-byte array, each element of which is one byte, the process of generating round key data including a one-byte substitution process through which an element of the first one-byte array is used as an index of a second one-byte array to obtain an element of the second one-byte array as a substituting replaced with another one-byte value;
a row shift transformation that is a process of performing row shifting for the data by use of a row shift table;
a byte substitution transformation that is a process of performing byte substitution for the data having undergone the row shift transformation by use of a byte substitution table whose source code is implemented as a one-dimensional array having a one-dimensional index one input parameter;
a column mix transformation that is a process of performing column mixing for the data having undergone the byte substitution transformation based on equivalent expressions; and
a key add transformation that is a process of performing an exclusive-OR operation with respect to the round key data and the data having undergone the column mix transformation,
generation of encrypted data using the data having undergone the key add transformation,
wherein the row shift transformation, the byte substitution transformation, the column mix transformation, and the key add transformation are performed on a four-byte-by-four-byte basis.

2. The information processing apparatus as claimed in claim 1, wherein the information processing apparatus is an embedded system.

3. The information processing apparatus as claimed in claim 1, wherein the column mix transformation is performed by a column mix table.

4. An information processing apparatus for decrypting data using AES, comprising:
a memory; and
an arithmetic unit coupled to the memory and configured to perform:
a process of generating round key data on a one-byte-by-one-byte basis with respect to a first one-byte array, each element of which is one byte, the process of generating round key data including a one-byte substitution process through which an element of the first one-byte array is used as an index of a second one-byte array to obtain an element of the second one-byte array as a substituting replaced with another one-byte value;
a row shift transformation that is a process of performing row shifting for the data by use of a row shift table;
a byte substitution transformation that is a process of performing byte substitution for the data having undergone the row shift transformation by use of a byte substitution table whose source code is implemented as a one-dimensional array having a one-dimensional index one input parameter;
a key add transformation that is a process of performing an exclusive-OR operation with respect to the data having undergone the byte substitution transformation; and
a column mix transformation that is a process of performing column mixing for the data having undergone the key add transformation based on equivalent expressions,
generation of decrypted data using the data having undergone the column mix transformation,
wherein the row shift transformation, the byte substitution transformation, the column mix transformation, and the key add transformation are performed on a four-byte-by-four-byte basis.

5. The information processing apparatus as claimed in claim 4, wherein the information processing apparatus is an embedded system.

6. The information processing apparatus as claimed in claim 4, wherein the column mix transformation is performed by a column mix table.

7. A non-transitory computer-readable recording medium having a program recorded therein for encrypting data using AES and for causing a computer to perform information processing, the program comprising:
a generation process step causing the computer to perform a process of generating round key data on a one-byte-by-one-byte basis with respect to a first one-byte array, each element of which is one byte, the process of generating round key data including a one-byte substitution process through which an element of the first one-byte array is used as an index of a second one-byte array to obtain an element of the second one-byte array as a substituting replaced with another one-byte value;
a row shift transformation step causing the computer to perform a row shift transformation that is a process of performing row shifting for the data by use of a row shift table;
a byte substitution transformation step causing the computer to perform a byte substitution transformation that is a process of performing byte substitution for the data having undergone the row shift transformation by use of a byte substitution table whose source code is implemented as a one-dimensional array having a one-dimensional index one input parameter;
a column mix transformation step causing the computer to perform a column mix transformation that is a process of performing column mixing for the data having undergone the byte substitution transformation based on equivalent expressions; and
a key add transformation step causing the computer to perform a key add transformation that is a process of performing an exclusive-OR operation with respect to the round key data and the data having undergone the column mix transformation,
an encryption step causing the computer to perform generation of encrypted data using the data having undergone the key add transformation,
wherein the row shift transformation, the byte substitution transformation, the column mix transformation, and the key add transformation are performed on a four-byte-by-four-byte basis.

8. A non-transitory computer-readable recording medium having a program recorded therein for decrypting data using AES and for causing a computer to perform information processing, the program comprising:
a generation process step causing the computer to perform a process of generating round key data on a one-byte-by-one-byte basis with respect to a first one-byte array, each element of which is one byte, the process of generating round key data including a one-byte substitution process through which an element of the first one-byte array is used as an index of a second one-byte array to obtain an element of the second one-byte array as a substituting replaced with another one-byte value;
a row shift transformation step causing the computer to perform a row shift transformation that is a process of performing row shifting for the data by use of a row shift table;
a byte substitution transformation step causing the computer to perform a byte substitution transformation that is a process of performing byte substitution for the data having undergone the row shift transformation by use of a byte substitution table whose source code is implemented as a one-dimensional array having a one-dimensional index one input parameter;

a key add transformation step causing the computer to perform a key add transformation that is a process of performing an exclusive-OR operation with respect to the data having undergone the byte substitution transformation; and a column mix transformation step causing the computer to perform a column mix transformation that is a process of performing column mixing for the data having undergone the key add transformation based on equivalent expressions;

a decryption step causing the computer to perform generation of decrypted data using the data having undergone the column mix transformation, wherein the row shift transformation, the byte substitution transformation, the column mix transformation, and the key add transformation are performed on a four-byte-by-four-byte basis.

* * * * *